United States Patent
Begino, III et al.

(10) Patent No.: US 11,664,721 B2
(45) Date of Patent: *May 30, 2023

(54) MULTIPHASE INTERLEAVED FORWARD POWER CONVERTERS INCLUDING CLAMPING CIRCUITS

(71) Applicant: Astec International Limited, Kowloon (HK)

(72) Inventors: John Faustino Begino, III, Pasig (PH); Nathaniel Franco Neri, Taguig (PH)

(73) Assignee: Astec International Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,653

(22) Filed: Apr. 1, 2022

(65) Prior Publication Data
US 2022/0224224 A1    Jul. 14, 2022

Related U.S. Application Data

(63) Continuation of application No. 17/068,899, filed on Oct. 13, 2020, now Pat. No. 11,296,595, which is a
(Continued)

(51) Int. Cl.
*H02M 1/42* (2007.01)
*H02M 3/335* (2006.01)

(52) U.S. Cl.
CPC ........... *H02M 1/4208* (2013.01); *H02M 1/42* (2013.01); *H02M 1/4258* (2013.01); *H02M 3/335* (2013.01)

(58) Field of Classification Search
CPC .... H02M 1/42; H02M 1/4208; H02M 1/4258; H02M 3/335–3378
See application file for complete search history.

(56) References Cited

U.S. PATENT DOCUMENTS

| 6,147,886 | A | 11/2000 | Wittenbreder |
| 6,272,023 | B1 | 8/2001 | Wittenbreder |

(Continued)

FOREIGN PATENT DOCUMENTS

| CN | 1332513 A | 1/2002 |
| CN | 101043182 A | 9/2007 |

(Continued)

OTHER PUBLICATIONS

Qian et al.; Dual Interleaved Active-Clamp Forward With Automatic Charge Balance Regulation for High Input Voltage Application; 2008; pp. 38-44.

(Continued)

*Primary Examiner* — Rafael O De León Domenech

(57) ABSTRACT

A multiphase interleaved forward power converter includes an inductor and first and second subconverter comprising respective transformers. The converter also includes first and second drives configured to respectively operate the first and second subconverters with cycling periods comprising a conduction period, a reset period, and an idle period. The first and second drives are also configured to phase shift the cycling periods in each subconverter such that the conduction period of the subconverter is at least partially complementary to the idle period of the other subconverter. The second drive also clamps a voltage across a winding of the transformer of the first subconverter to substantially prevent a first resonance voltage from propagating in the first subconverter during the idle period of the first subconverter.

20 Claims, 25 Drawing Sheets

Related U.S. Application Data continuation of application No. 14/955,787, filed on Dec. 1, 2015, now Pat. No. 10,985,647.

(56) References Cited

U.S. PATENT DOCUMENTS

| | | | |
|---|---|---|---|
| 9,165,707 | B2 | 10/2015 | Kippley et al. |
| 2007/0103941 | A1 | 5/2007 | Liu et al. |
| 2008/0190906 | A1 | 8/2008 | Aigner |
| 2013/0083575 | A1* | 4/2013 | Kippley ............... H01F 27/38 363/64 |
| 2014/0056032 | A1 | 2/2014 | Pan et al. |
| 2014/0254203 | A1* | 9/2014 | Dai ................... H02M 3/01 363/17 |
| 2014/0374398 | A1 | 12/2014 | Manthe |
| 2015/0117068 | A1* | 4/2015 | Yin ............... H02M 3/33592 363/21.06 |

FOREIGN PATENT DOCUMENTS

| | | |
|---|---|---|
| CN | 101951154 A | 1/2011 |
| CN | 202798465 U | 3/2013 |

OTHER PUBLICATIONS

Zhang et al.; A New Interleaved Active-Clamp Forward Converter with Parallel Input and Series-Parallel Output; 2009; pp. 40-44.
Zhang et al.; Analysis and Evaluation of Interleaving Techniques in Forward Converters; 1998; pp. 690-.

* cited by examiner

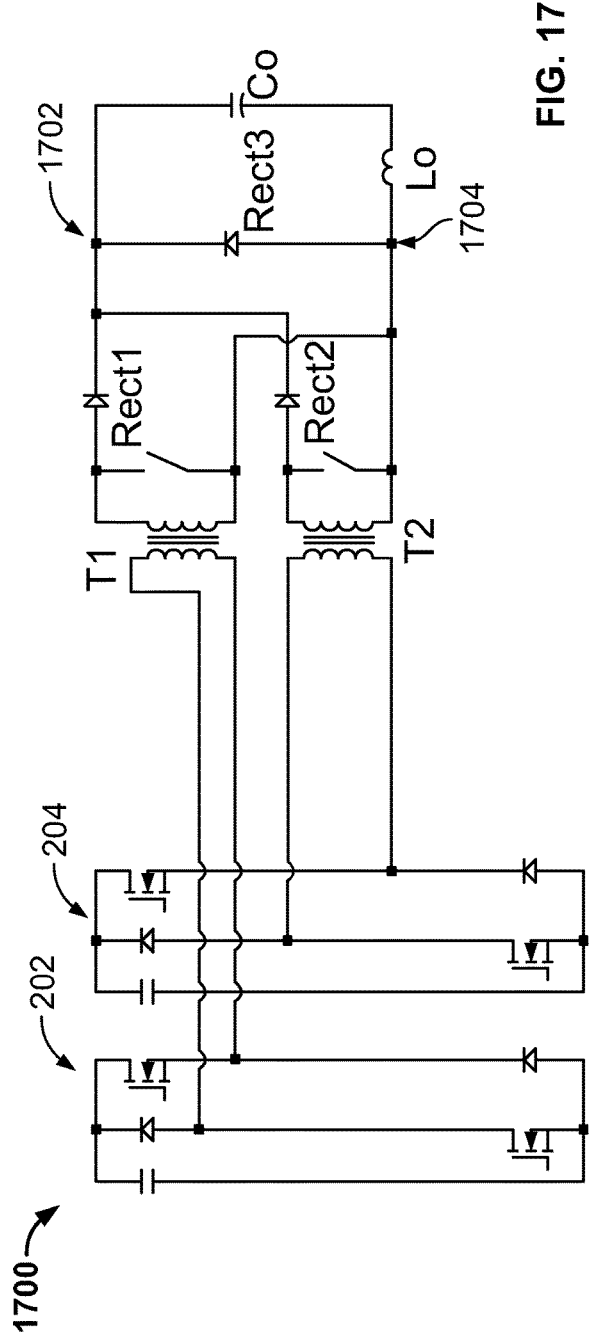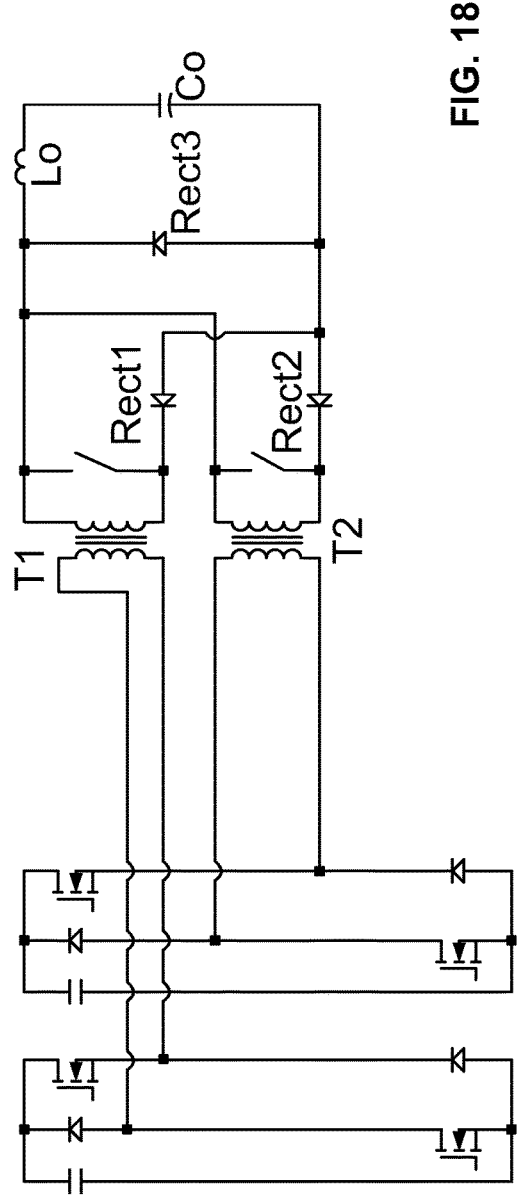
FIG. 17
FIG. 18

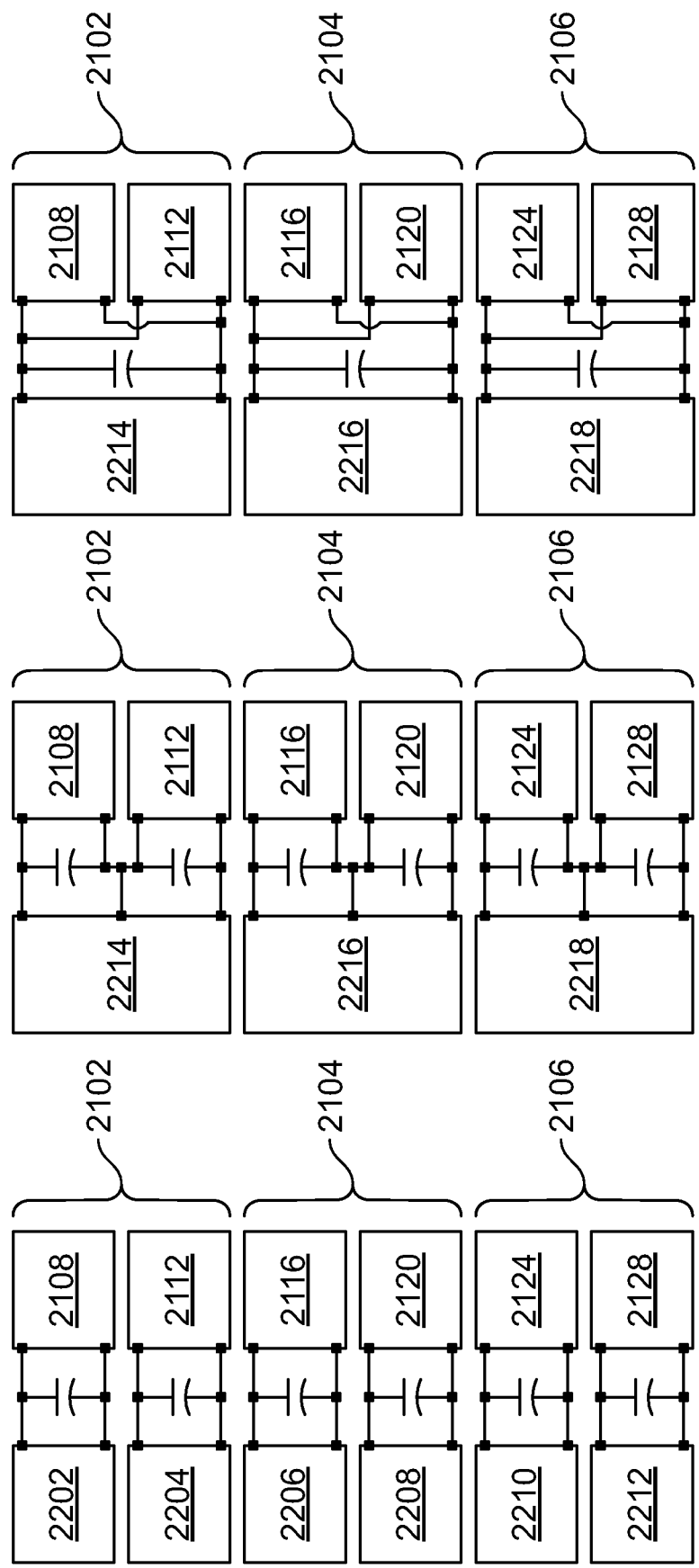

US 11,664,721 B2

MULTIPHASE INTERLEAVED FORWARD POWER CONVERTERS INCLUDING CLAMPING CIRCUITS

CROSS-REFERENCE TO RELATED APPLICATIONS

This application claims the benefit of and priority to U.S. application Ser. No. 17/068,899 filed Oct. 13, 2020, and published as U.S. Pat. No. 11,296,595, which claims the benefit of and priority to U.S. application Ser. No. 14/955,787 filed Dec. 1, 2015, and published as U.S. Pat. No. 10,985,647, the entire disclosures of which are incorporated herein by reference.

FIELD

The present disclosure relates to multiphase interleaved forward power converters including clamping circuits.

BACKGROUND

This section provides background information related to the present disclosure which is not necessarily prior art.

Forward power converters are DC/DC converters that use a transformer to change its output voltage and provide isolation. Frequently, multiple forward power converters are coupled together to form a multiphase interleaved forward power converter. In such cases, each power converter is phase shifted from each other so that one converter conducts at a time. For example, each power converter includes a cycling conduction period, reset period, and idle period. Typically, when one of the converters is in its conduction period, the other converter(s) are in their reset period or idle period.

SUMMARY

This section provides a general summary of the disclosure, and is not a comprehensive disclosure of its full scope or all of its features.

According to one aspect of the present disclosure, a multiphase interleaved forward power converter includes an inductor, a first subconverter comprising a first transformer coupled to an output of the first subconverter, and a first clamping circuit comprising a switching device coupled to the at least one winding of the first subconverter. The multiphase interleaved forward power converter also includes a second subconverter comprising a second transformer coupled to an output of the second subconverter. The first and second transformers have at least one winding. The multiphase interleaved forward power converter also includes first and second drives configured to respectively operate the first and second subconverters with cycling periods comprising a conduction period during which power is provided to the output of the respective first or second subconverter via the respective first or second transformer, a reset period during which energy stored in the respective first or second transformer is released to reset the respective first or second transformer, and an idle period between the reset period and the conduction period. The first drive is further configured to phase shift the cycling periods in the first subconverter such that the conduction period of the first subconverter is at least partially complementary to the idle period of the second subconverter. The second drive is further configured to phase shift the cycling periods in the second subconverter such that the conduction period of the second subconverter is at least partially complementary to the idle period of the first subconverter and clamp a voltage across a winding of the transformer of the first subconverter to substantially prevent a first resonance voltage from propagating in the first subconverter during the idle period of the first subconverter. The output of the first subconverter is coupled in parallel with the output of the second subconverter, and the outputs of the first and second subconverters are coupled to the inductor.

According to another aspect of the present disclosure, a method for substantially preventing a resonance voltage from propagating in a multiphase interleaved forward power converter including an inductor coupled to an output of a first subconverter including a first transformer and an output of a second subconverter including a second transformer, the outputs of the first and second subconverters coupled in parallel. The method comprises operating the first and second subconverters with respective cycling periods, each cycling period comprising a conduction period during which power is provided to the respective subconverter output via the respective transformer, a reset period during which energy stored in respective transformer is released to reset the respective transformer, and an idle period between the reset period and the conduction period. The method also includes phase shifting the cycling periods in the first and second subconverters such that the conduction period of the first subconverter is at least partially complementary to the idle period of the second subconverter and such that the conduction period of the second subconverter is at least partially complementary to the idle period of the first subconverter, and clamping a voltage across a winding of the transformer of the first subconverter to substantially prevent a first resonance voltage from propagating in the first subconverter during the idle period of the first subconverter.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 17 is a circuit diagram of a multiphase interleaved forward power converter including an inductor coupled to a reference output terminal of the converter according to yet another example embodiment.

FIG. 18 is a circuit diagram of a multiphase interleaved forward power converter including a rectification circuit having diodes with their anodes coupled together according to another example embodiment.

FIGS. 22A-22E are circuit diagrams of the subconverters of FIG. 21 coupled to one or more power sources according to another example embodiment.

Corresponding reference numerals indicate corresponding parts or features throughout the several views of the drawings.

DETAILED DESCRIPTION

Figure 1:
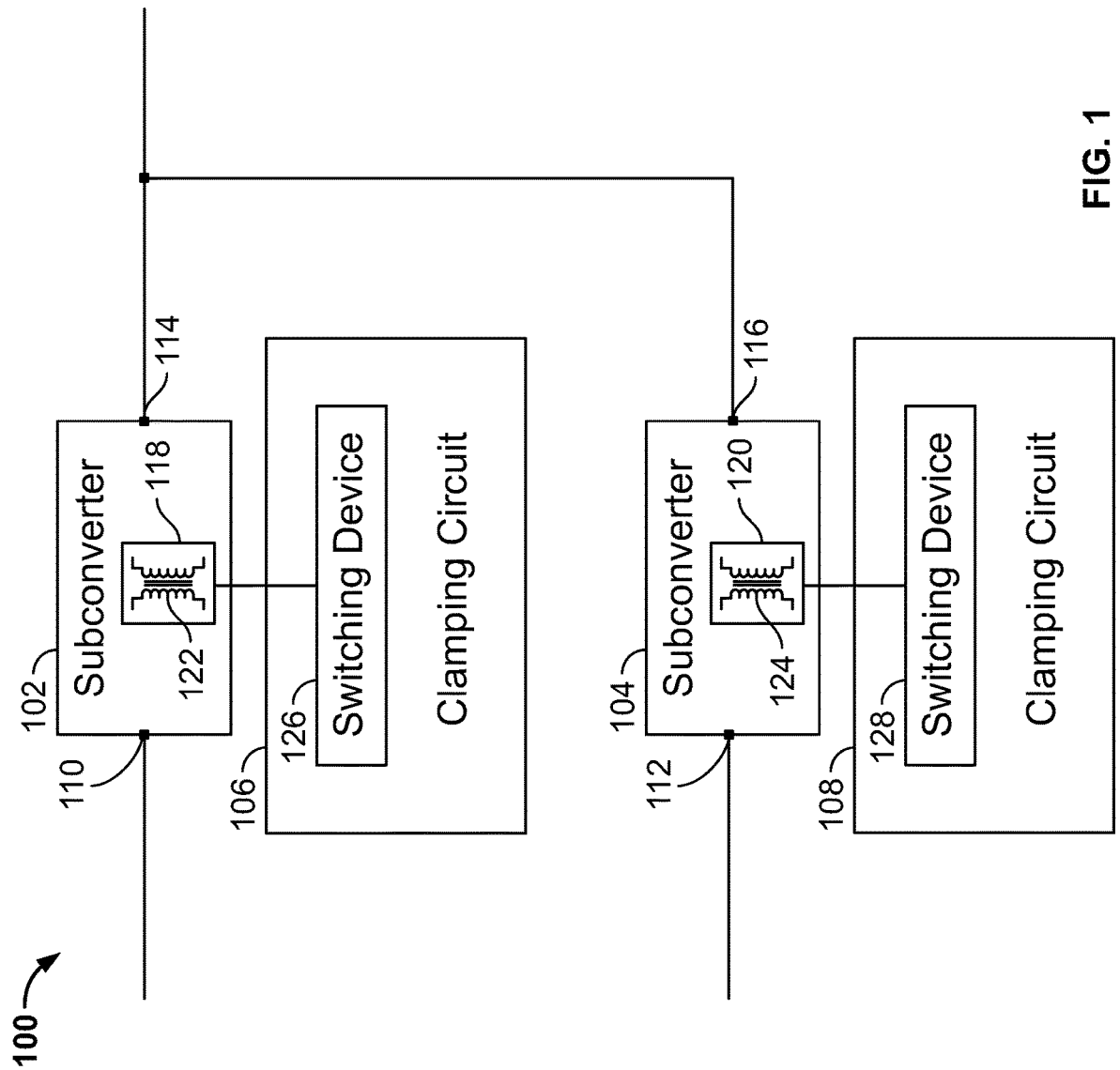
FIG. 1 is a block diagram of a multiphase interleaved forward power converter including clamping circuits each having a switching device according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to one aspect of the present disclosure, methods are provided for substantially preventing a resonance voltage from propagating in a multiphase interleaved forward power converter. The converter includes at least two subconverters phase shifted relative to each other such that a conduction period of one subconverter is at least partially complementary to an idle period of another subconverter and vice versa. The method includes clamping a voltage across a winding of a transformer of one of the subconverters to substantially prevent a resonance voltage from propagating in that subconverter during its idle period.

Additionally, the method may further include clamping a voltage across a winding of a transformer of the other subconverter to substantially prevent a resonance voltage from propagating in that subconverter during its idle period. Thus, resonance voltage may be substantially prevented in one or more subconverters of the multiphase interleaved forward power converter.

For example, during an idle time of one subconverter of a multiphase interleaved forward power converter, a voltage across a primary winding of its transformer is expected to equal substantially zero as the subconverter is not conducting at this time. In some cases, however, the voltage across the primary winding may resonant due to transformer leakage inductance, capacitance in primary side switch(es), etc. Thus, the voltage across the primary winding may swing from about zero volts to about an input voltage of this forward power converter. This resonance voltage can create transformer conduction losses, increased switching losses in the primary side switch(es), etc.

Additionally, if the resonance voltage is terminated before a complete resonant cycle, additional DC bias voltage may be applied to the transformer. This may increase flux density in the transformer causing additional transformer core losses.

If, however, a current path is created to allow the transformer winding of the idle subconverter to conduct, a voltage across its idle transformer can be clamped and a DC bias voltage applied to the transformer can be substantially prevented. As such, the voltage across the transformer may be substantially prevented from resonating during the subconverter's idle period. Thus, a voltage across primary side power switches of the subconverters can remain relatively steady at a desired level. For example, if the subconverters include a two-switch forward converter topology (as further explained below), a voltage across these switches can remain steady at about half the DC input voltage.

The current path may be created based one or more other subconverters in the forward power converter. For example, the current path may be created between a winding of the idle subconverter and a component of one or more other subconverter(s) when the other subconverter(s) are in a conduction period. Thus, one or more conducting subconverters in the forward power converter may assist in clamping a voltage across the transformer of an idle subconverter.

For example, and as further explained below, clamping in one subconverter may be based on a parameter of the other subconverter(s) in the forward power converter. This parameter may be, for example, a control signal for primary side switch(es) in the other subconverter(s), a sensed electrical parameter (e.g., a voltage, a current, etc.), etc. In some particular examples, the voltage may be a voltage of a secondary transformer winding, a rectifier voltage, etc.

One or more of the methods disclosed herein may be implemented by a clamping circuit including, for example, any one of the clamping circuits disclosed herein and/or another suitable clamping circuit. As further explained below, FIGS. 1-20 illustrate various example multiphase interleaved forward power converters including clamping circuits for creating current paths as explained herein.

For example, FIG. 1 illustrates a multiphase interleaved forward power converter according to one example embodiment of the present disclosure and is indicated generally by reference number 100. As shown in FIG. 1, the forward power converter 100 includes subconverters 102, 104 and clamping circuits 106, 108. The subconverters 102, 104 each include an input 110, 112, an output 114, 116, and a transformer 118, 120 coupled between the input and the output. Each transformer 118, 120 includes at least one winding 122, 124. As shown in FIG. 1, the output 114 of the subconverter 102 is coupled in parallel with the output 116 of the subconverter 104. The subconverters 102, 104 are phase shifted relative to each other as explained above. The clamping circuits 106, 108 each include a switching device 126, 128 coupled to the winding 122, 124.

The clamping circuits 106, 108 can clamp a voltage across the windings 122, 124 to substantially prevent a resonance voltage from propagating in the subconverter 102, 104 (e.g., in primary side switches, secondary side switches, the transformer, etc.) during an idle period of the subconverters. For example, the subconverter 102 may be in its conduction period and the subconverter 104 may be in its idle period. The clamping circuit 108 may create a current path to allow the winding 124 to conduct during the idle period of the subconverter 104 as explained above.

The clamping circuit 106, 108 of FIG. 1 can be coupled across the winding 122, 124 of the transformer 118, 120, respectively. For example, the switching device 126, 128 may be coupled across the winding 122, 124.

The winding coupled to the clamping circuit may be a primary winding, a secondary winding, an auxiliary winding, etc. For example, FIG. 2 illustrates a multiphase interleaved forward power converter 200 including two subconverters 202, 204 each having a transformer T1, T2, and two clamping circuits 206, 208 each having a switching device 210, 212 coupled across a secondary winding of the transformer T1, T2, respectively.

Figure 2:
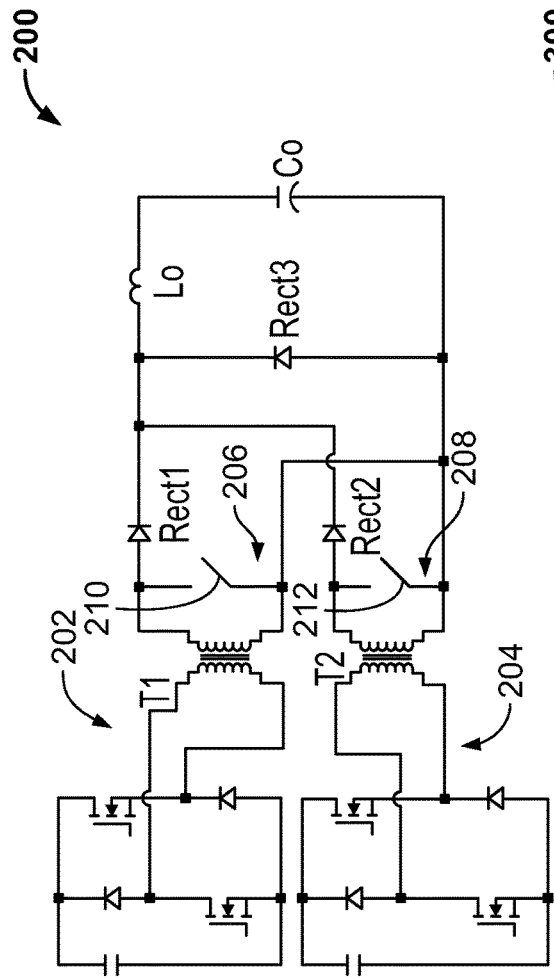
FIG. 2 is a circuit diagram of a multiphase interleaved forward power converter including two subconverters and two clamping circuits coupled to secondary transformer windings of the subconverters according to another example embodiment.
Figure 3:
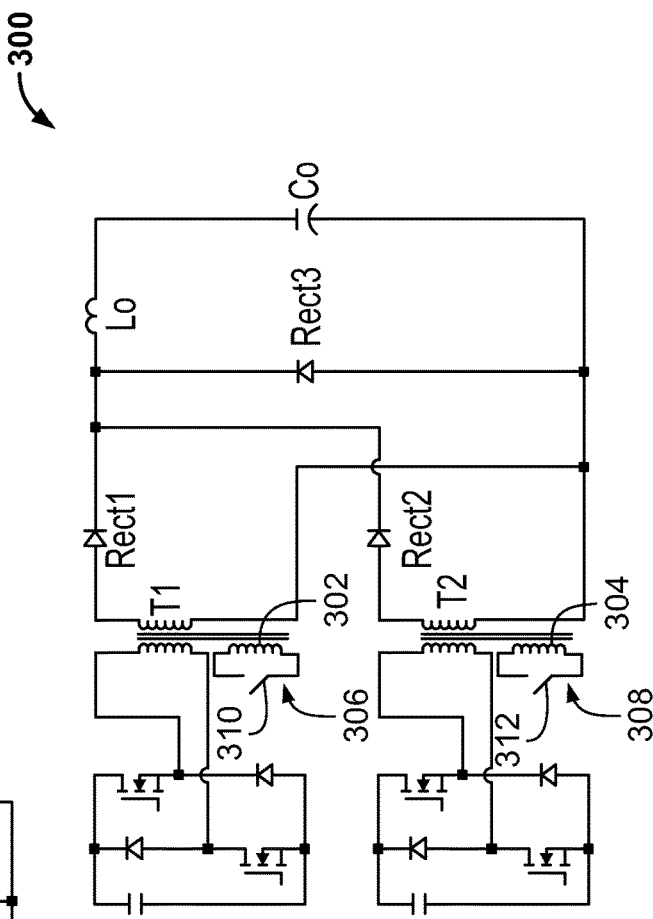
FIG. 3 is a circuit diagram of a multiphase interleaved forward power converter including two subconverters and two clamping circuits coupled to primary side auxiliary transformer windings of the subconverters according to yet another example embodiment.
Figure 4:
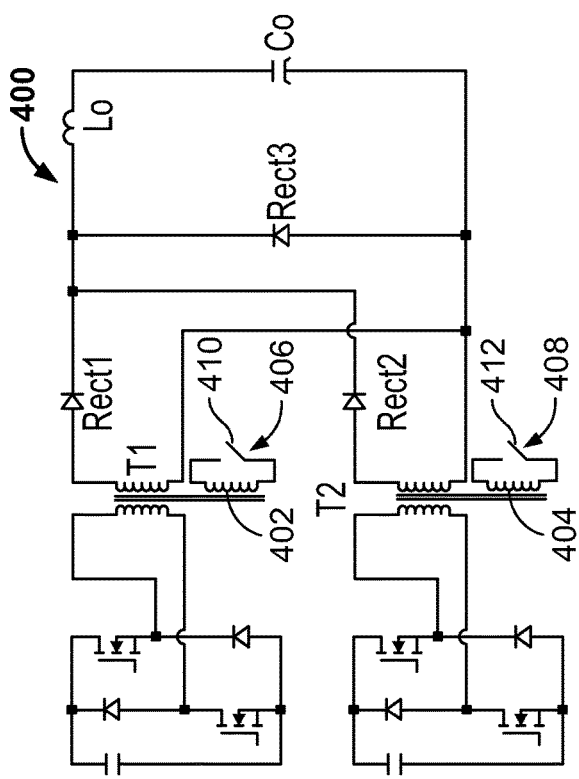
FIG. 4 is a circuit diagram of a multiphase interleaved forward power converter including two subconverters and two clamping circuits coupled to secondary side auxiliary transformer windings of the subconverters according to another example embodiment.

FIGS. 3 and 4 illustrate example multiphase interleaved forward power converters 300, 400 substantially similar to the power converter 200 of FIG. 2, but including a clamping circuit having a switching device coupled across an auxiliary winding of a transformer. In particular, the forward power converter 300 includes clamping circuits 306, 308 each having a switching device 310, 312 coupled across a primary side auxiliary winding 302, 304, respectively, and the forward power converter 400 includes clamping circuits 406, 408 each having a switching device 410, 412 coupled across a secondary side auxiliary winding 402, 404, respectively.

Figure 5:
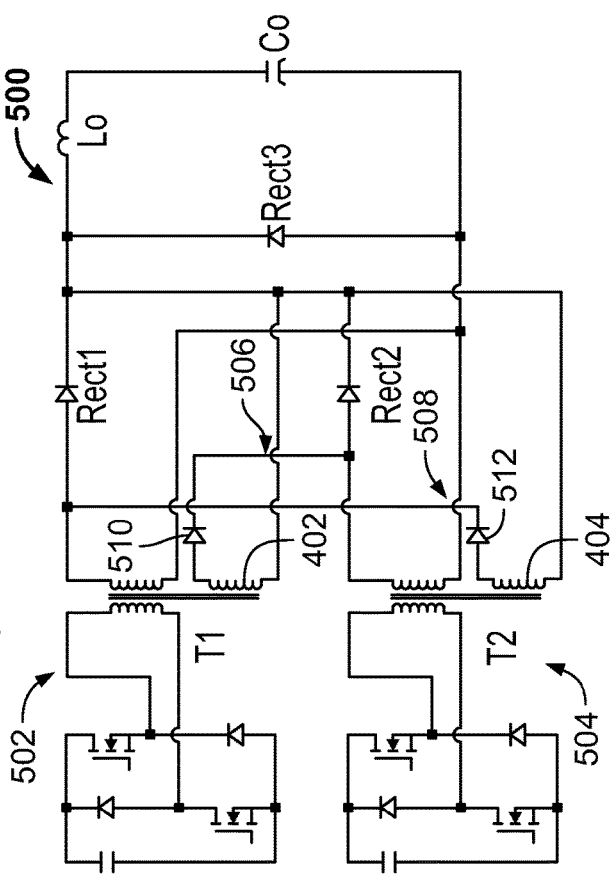
FIG. 5 is a circuit diagram of a multiphase interleaved forward power converter including two subconverters and two clamping circuits including diodes coupled to secondary side auxiliary transformer windings of the subconverters according to yet another example embodiment.

FIG. 5 illustrates a multiphase interleaved forward power converter 500 substantially similar to the power converter 400 of FIG. 4. The forward power converter 500 of FIG. 5 includes subconverters 502, 504 having the transformers T1, T2 of FIG. 4, and clamping circuits 506, 508 coupled to the subconverters 502, 504. The clamping circuits 506, 508 each include a diode 510, 512 coupled to the secondary side auxiliary winding 402, 404, respectively. Thus, in the particular embodiment of FIG. 5, the switching devices of the clamping circuits 506, 508 are diodes. Alternatively, one or both diodes 510, 512 can be replaced with another suitable switching device such as a switch (e.g., transistors, etc.) as further explained below.

As shown in FIG. 5, the auxiliary windings 402, 404, the diodes 510, 512, and diodes Rect1, Rect2 of a rectification circuit (further explained below) create a current path. Thus, in this example, the auxiliary windings 402, 404 and the diodes Rect1, Rect2 can be considered components of the clamping circuits 508, 506, respectively.

As explained above, the current paths allow the windings 402, 404 to conduct during a subconverter's idle period. For example, when the subconverter 502 is in its conduction period and the subconverter 504 is in its idle period, a resonant voltage forces current to flow through the diode 512, the diode Rect1, and the auxiliary winding 404. Similarly, when the subconverter 504 is in its conduction period and the subconverter 502 is in its idle period, a resonant voltage forces current to flow through the diode 510, the diode Rect2, and the auxiliary winding 402.

Additionally, the diodes 510, 512 may prevent its respective clamping circuit 506, 508 from conducting during a reset period of each subconverter 502, 504. For example, when the conduction period of the subconverter 502 starts and the subconverter 504 is its reset period (before transitioning to its idle period), the diode 512 is reversed-biased. Thus, the clamping circuit 508 is prevented from conducting due to the diode 512. As the subconverter 504 transitions from its reset period to its idle period, a resonant voltage begins to build up. At some point, the diode 512 becomes forward-biased due to the increasing resonant voltage, and therefore the clamping circuit 508 is allowed to conduct as explained above. As such, any attempt of the idle subconverter resonance to prosper during the conduction period of the other subconverter can be substantially blocked by the appropriate clamping circuit.

Figure 6:
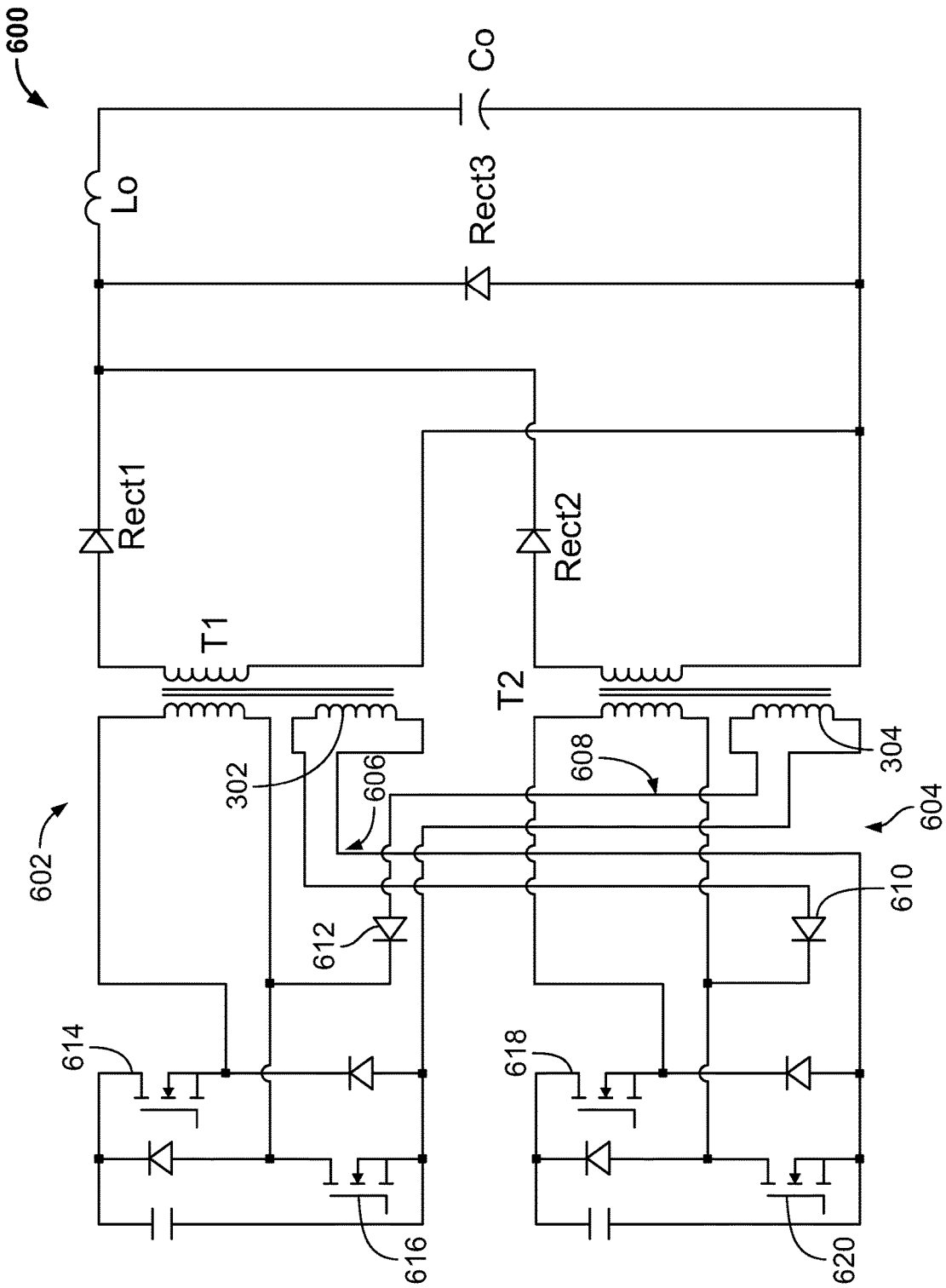
FIG. 6 is a circuit diagram of a multiphase interleaved forward power converter including two subconverters and two clamping circuits including diodes coupled to primary side auxiliary transformer windings of the subconverters according to yet another example embodiment.

FIG. 6 illustrates a multiphase interleaved forward power converter 600 substantially similar to the power converter 500 of FIG. 5, but with clamping circuits coupled to primary side auxiliary windings. As shown in FIG. 6, the forward power converter 600 includes subconverters 602, 604 and clamping circuits 606, 608. The subconverter 602 includes, an input, the transformer T1 of FIG. 3 and primary side power switches 614, 616 (collectively a switching circuit) coupled to the transformer T1. The subconverter 604 includes an input, the transformer T2 of FIG. 3, and primary side power switches 618, 620 (collectively a switching circuit) coupled to the transformer T2. The clamping circuits 606, 608 include diodes 610, 612, respectively. The diodes 610, 612 function similar to the diodes 510, 512 of FIG. 5, but are positioned on a primary side of the transformers T1, T2.

The clamping circuit 606 creates a current path with the diode 610, the auxiliary winding 302 of the subconverter 602, and the power switch 620 of the subconverter 604. Similarly, the clamping circuit 608 creates a current path with the diode 612, the auxiliary winding 304 of the subconverter 604, and the power switch 616 of the subconverter 602. Thus, in the example of FIG. 6, the auxiliary winding 302, 304 and the power switches 620, 616 can be considered components of the clamping circuits 606, 608, respectively. As such, the switching device of the clamping circuits of FIG. 6 can be the diodes 610, 612 and/or the power switches 616, 620.

Figure 7:
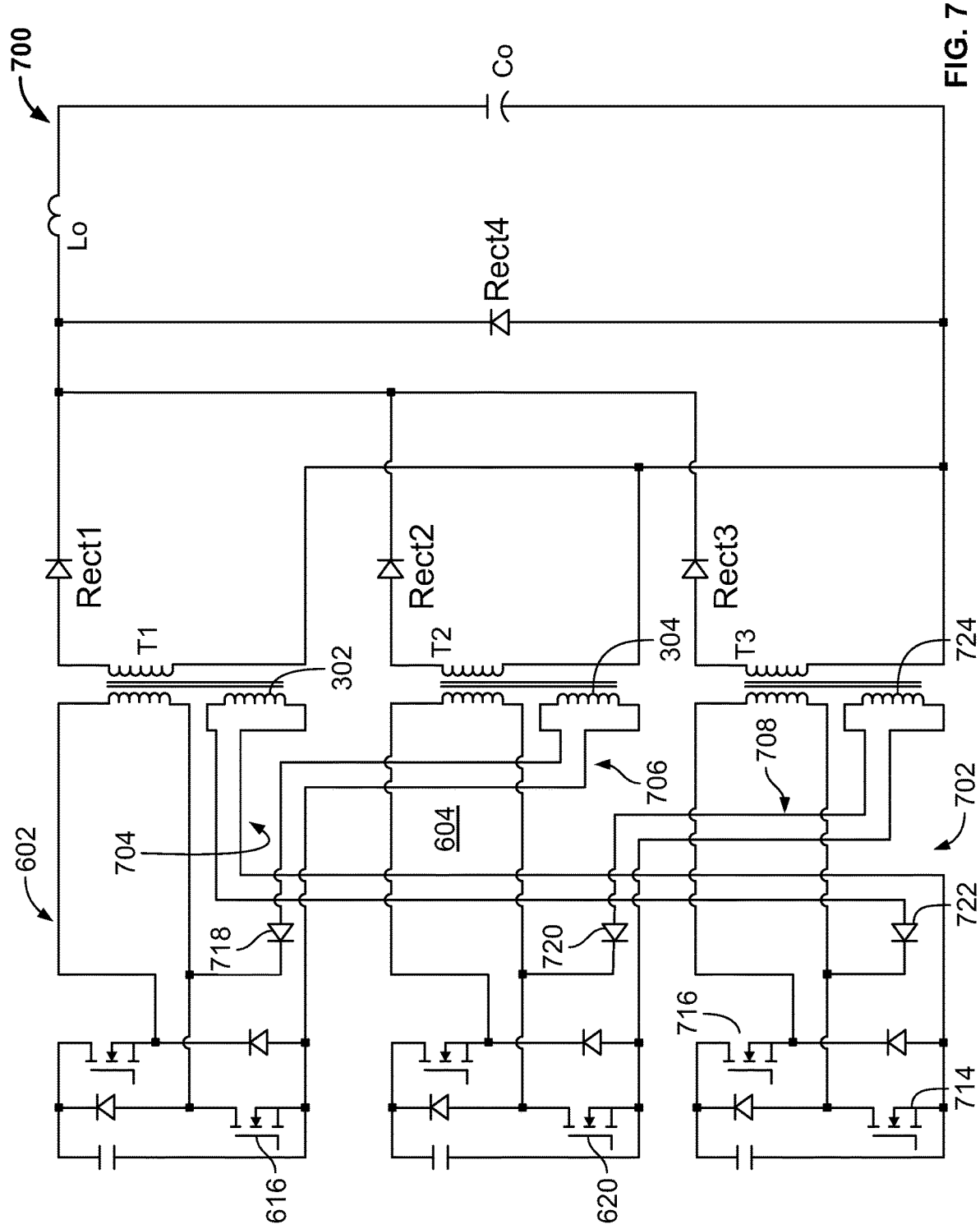
FIG. 7 is a circuit diagram of a multiphase interleaved forward power converter similar to the forward power converter 6, but including three subconverters and three clamping circuits according to another example embodiment.

Additionally, although the forward power converters of FIGS. 1-6 include two subconverters, it should be understood that any one of the forward power converters disclosed herein may include two or more subconverters. For example, FIG. 7 illustrates multiphase interleaved forward power converter 700 substantially similar to the forward power converter 600 of FIG. 6. The forward power converter 700, however, includes three subconverters and three clamping circuits As shown in FIG. 7, the forward power converter 700 includes a subconverter 702, the subconverters 602, 604 of FIG. 6, and three clamping circuits 704, 706, 708 having diodes 718, 720, 722, respectively. The diodes 718, 720, 722 function similar to the diodes 610, 612 of FIG. 6. Additionally, and similar to the subconverters 602, 604, the subconverter 702 includes an input, an output, a transformer T3 coupled between the input and the output, and primary side power switches 714, 716 (collectively a switching circuit) coupled to the transformer T3.

The clamping circuits 704, 706, 708 create current paths to allow the auxiliary winding 302, 304, 724 to conduct during its respective subconverter's idle period as explained above. In particular, the clamping circuit 704 creates a current path with the diode 722, the auxiliary winding 302 of the subconverter 602, and the power switch 714 of the subconverter 702. Similarly, the clamping circuits 706, 708 create similar current paths using the diodes 718, 720, the power switch 616 of the subconverter 602, the power switch 620 of the subconverter 604, the auxiliary winding 304 of the subconverter 604, and an auxiliary winding 724 of the transformer T3. Thus, and similar to the clamping circuits 606, 608 of FIG. 6, each clamping circuit clamps a voltage across an auxiliary winding by using a component of a different subconverter.

In some examples, the subconverters 602, 604, 702 may be phase shifted such that an idle period of one subconverter at least partially coincides with a conduction period of only one subconverter. In such cases, the clamping circuits 704, 706, 708 can be controlled as explained above relative to a two subconverter system.

If, however, an idle period of one subconverter coincides with a conduction period of more than one subconverter, one or more clamping circuits may be employed per subconverter in an "OR" logic manner to cover more than one conduction period. For example, one clamping circuit can be coupled between the subconverter 602 and the subconverter 702 and another clamping circuit can be coupled between the subconverter 602 and the subconverter 604. The clamping circuits can be coupled together with an "OR" logic function (e.g., an OR gate, etc.) to ensure clamping circuits cover more than one conduction period. In such examples, each current path created by the clamping circuit can include its own transformer winding, rectifier, switching device, etc. In other examples, each current path can share one transformer winding and have its own rectifier, switching device, etc. Alternatively, one clamping circuit can be coupled between the subconverter 602 and the subconverters 604, 702 via an "OR" logic function.

Figure 8:
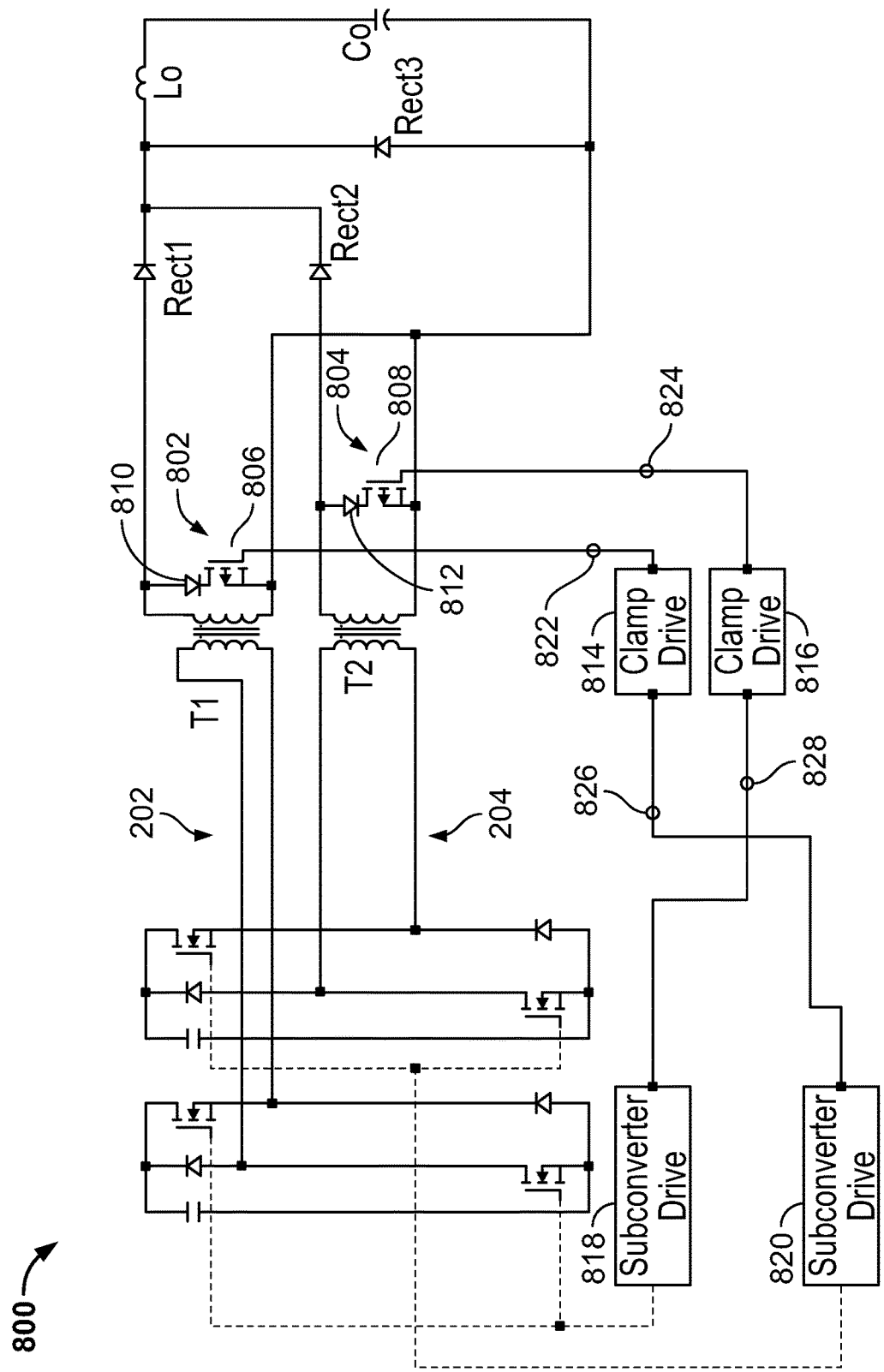
FIG. 8 is a circuit diagram of a multiphase interleaved forward power converter including two subconverters and two clamping circuits each coupled to a secondary transformer winding of the subconverters and controlled based on a primary side switch control signal according to yet another example embodiment.

In some example embodiments, a switching device of the clamping circuit may be controlled to create a current path. For example, FIG. 8 illustrates a multiphase interleaved forward power converter 800 including the subconverters 202, 204 of FIG. 2 having the transformers T1, T2, and clamping circuits 802, 804 coupled across a secondary winding of the transformers T1, T2. The clamping circuits 802, 804 each include a switching device 806, 808 and a diode 810, 812 coupled to the switching device 806, 808. In the particular example of FIG. 8, the switching devices 806, 808 are MOSFETs.

The clamping circuits 802, 804 may create current paths by using the switching devices 806, 808, the diodes 810, 812, and the secondary windings of the transformers T1, T2. These current paths can be broken by controlling the switching devices 806, 808. For example, and as shown in FIG. 8, the forward power converter 800 includes subconverter drive circuits 818, 820 and clamp drive circuits 814, 816 for generating control signals 822, 824 to control the switching devices 806, 808. In the particular example of FIG. 8, the control signals for the switching devices 806, 808 are based on a signal 826, 828 from the subconverter drive circuits 818, 820.

The control signals generated for the switching devices 806, 808 may be based on a parameter of the opposing subconverter. For example, and as shown in FIG. 8, the control signals generated by the clamp drive circuit 814 for controlling the switching device 806 (coupled to the transformer of the subconverter 202) is based on a signal 826 from the subconverter drive circuit 820, which controls power switches of the subconverter 204. Similarly, the control signals generated by the clamp drive circuit 816 for controlling the switching device 808 (coupled to the transformer of the subconverter 204) is based on a signal 828 from the subconverter drive circuit 818, which controls power switches of the subconverter 202.

Thus, when the subconverter 202 is in its conductive period and the subconverter 204 is in its idle period, the subconverter drive circuit 818 may provide the signal 828 indicating the subconverter 202 is in its conductive period to the clamp drive circuit 816. The clamp drive circuit 816 may then close the switching device 808 to create a current path for the clamping circuit 804 as explained above.

Although not shown in FIG. 8, additional isolation components may be used to provide desired isolation in the forward power converter 800. For example, gate drive transformers, optocouplers and/or other suitable isolation components may be used to pass signals between the primary side and the secondary side of the transformers to control switching devices (e.g., one or both switching devices 806, 808, one or more switching devices of the subconverters 202, 204, etc.).

Figure 9:
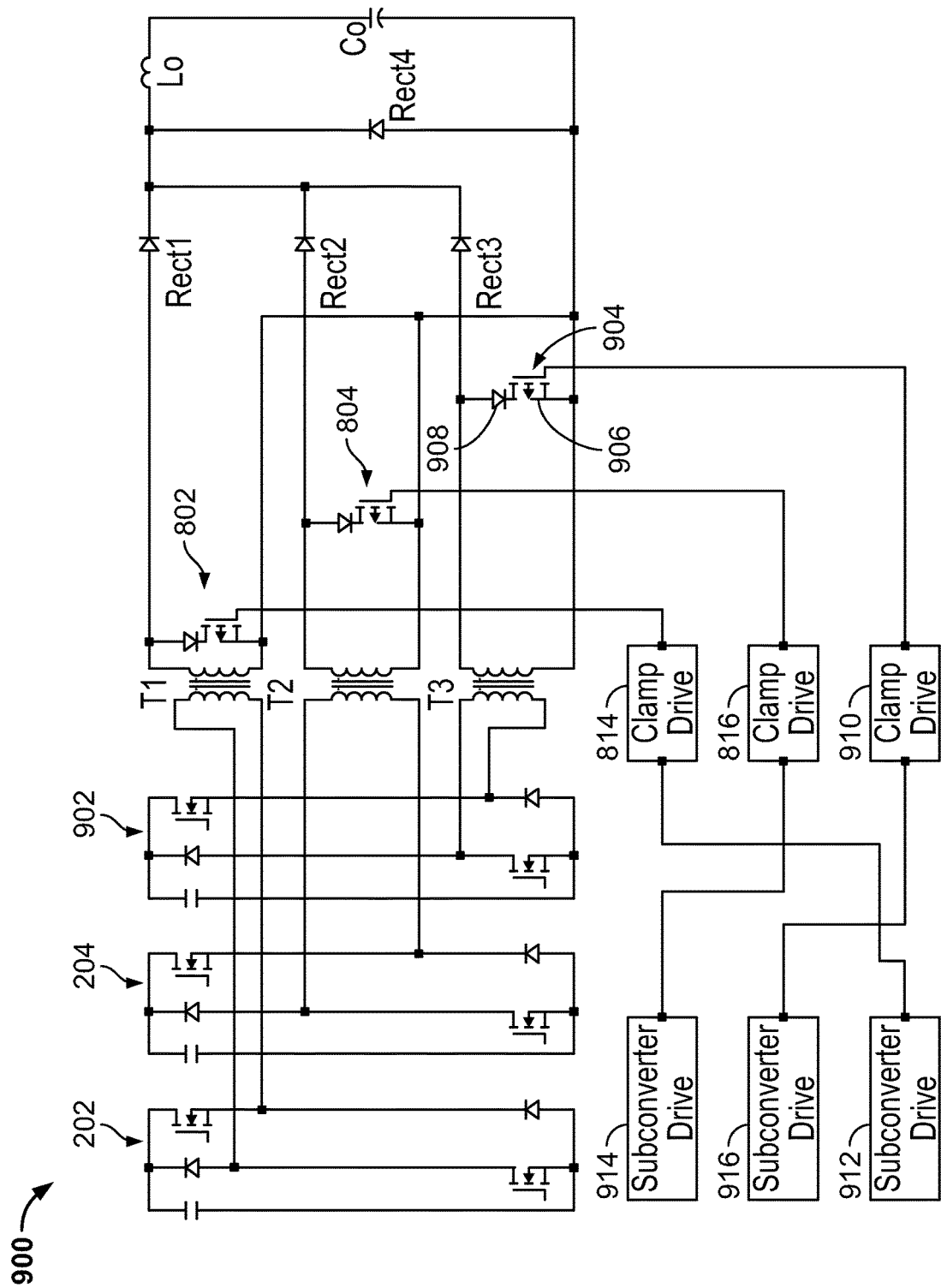
FIG. 9 is a circuit diagram of a multiphase interleaved forward power converter similar to the forward power converter 8, but including three subconverters and three clamping circuits according to another example embodiment.

FIG. 9 illustrates a multiphase interleaved forward power converter 900 similar to the forward power converter 800 of FIG. 8, but including a third subconverter. For example, the forward power converter 900 includes the subconverters 202, 204 having the transformers T1, T2 and the clamping circuits 802, 804 of FIG. 8, as well as a subconverter 902 having a transformer T3 and a clamping circuit 904. Similar to the clamping circuits 802, 804, the clamping circuit 904 includes a switching device 906 and a diode 908 coupled to the switching device 906.

The switching devices of the clamping circuits 802, 804 are controlled by clamp drive circuits 814, 816 of FIG. 8, and the switching device 906 of the clamping circuit 904 is controlled by a clamp drive circuit 910 to create current paths as explained above. The clamp drive circuits 814, 816, 910 are coupled to subconverter drive circuits 912, 914, 916, respectively. Although not shown in FIG. 9, the subconverter drive circuits 912, 914, 916 control power switches in the subconverters 902, 202, 204, respectively. Thus, similar to FIG. 8, the clamp drive circuit of FIG. 9 corresponding to an idle subconverter may close its switching device to create a current path based on a control signal indicating another subconverter is in its conductive period.

Figure 10:
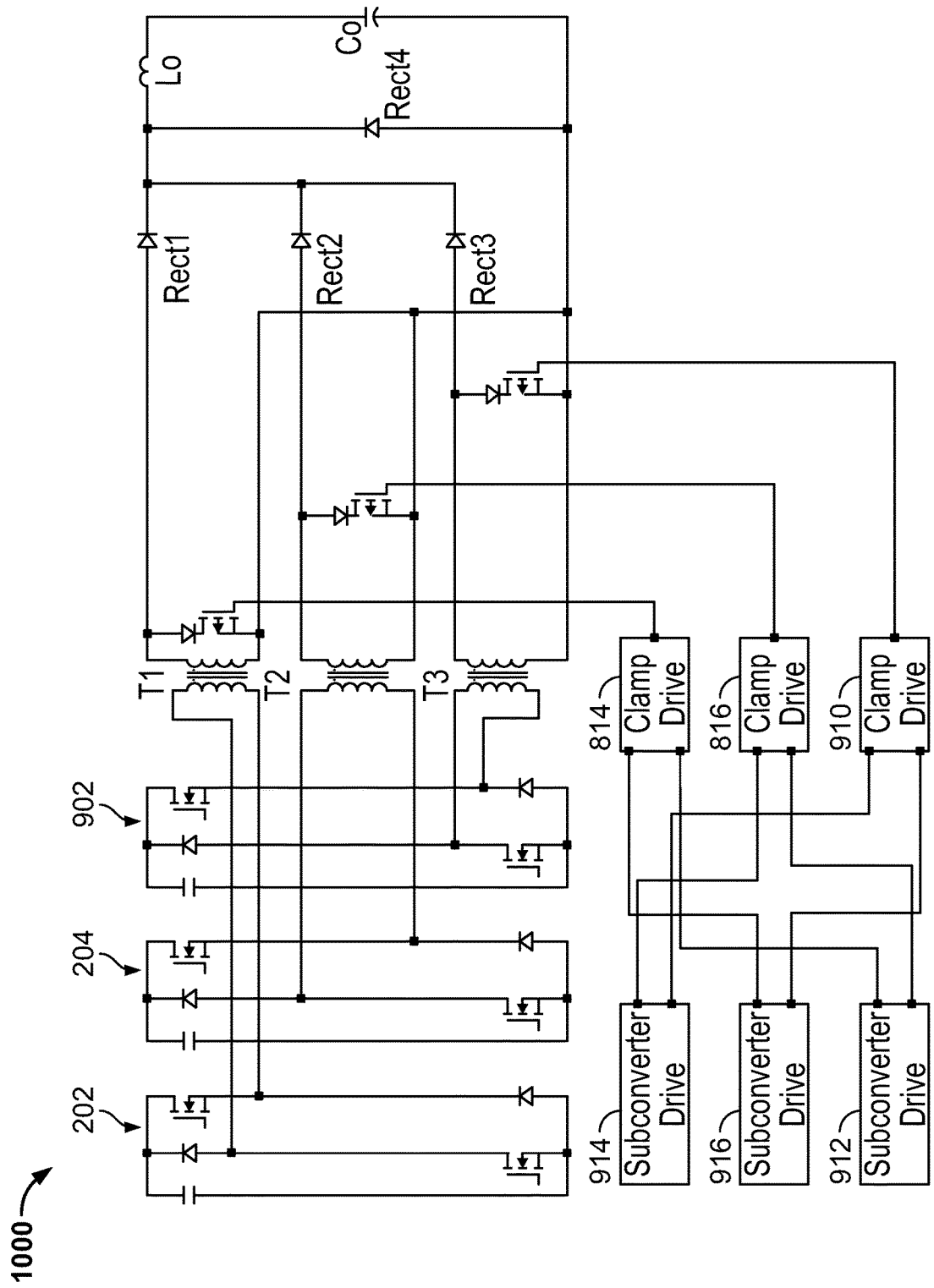
FIG. 10 is a circuit diagram of a multiphase interleaved forward power converter including three subconverters and three clamping circuits each coupled to a secondary transformer winding of the subconverters and controlled based on two primary side switch control signals according to yet another example embodiment.

In some embodiments, a switching device of a clamping circuit in a forward power converter having three or more subconverters may be controlled based the other subconverters not coupled to that switching device. For example, FIG. 10 illustrates a multiphase interleaved forward power converter 1000 similar to the forward power converter 900 of FIG. 9. Each clamp drive circuit 814, 816, 910, however, generates control signal(s) based on two subconverter drive circuit signals. Thus, control signal(s) to control the switching device of one clamping circuit (corresponding to one subconverter) is based on signals for controlling power switches of the other two subconverters.

For instance, and as in FIG. 9, the subconverter drive circuits 912, 914, 916 of FIG. 10 control the power switches of the subconverters 902, 202, 204, respectively. The clamp drive circuit 814 generates control signal(s) to control its corresponding switching device coupled to the subconverter 202 based on the subconverter drive circuits 912, 916. Similarly, the clamp drive circuit 816 generates control signal(s) to control its corresponding switching device coupled to the subconverter 204 based on the subconverter drive circuits 914, 912, and the clamp drive circuit 910 generates control signal(s) to control its corresponding switching device coupled to the subconverter 902 based on the subconverter drive circuits 914, 916.

Figure 11:
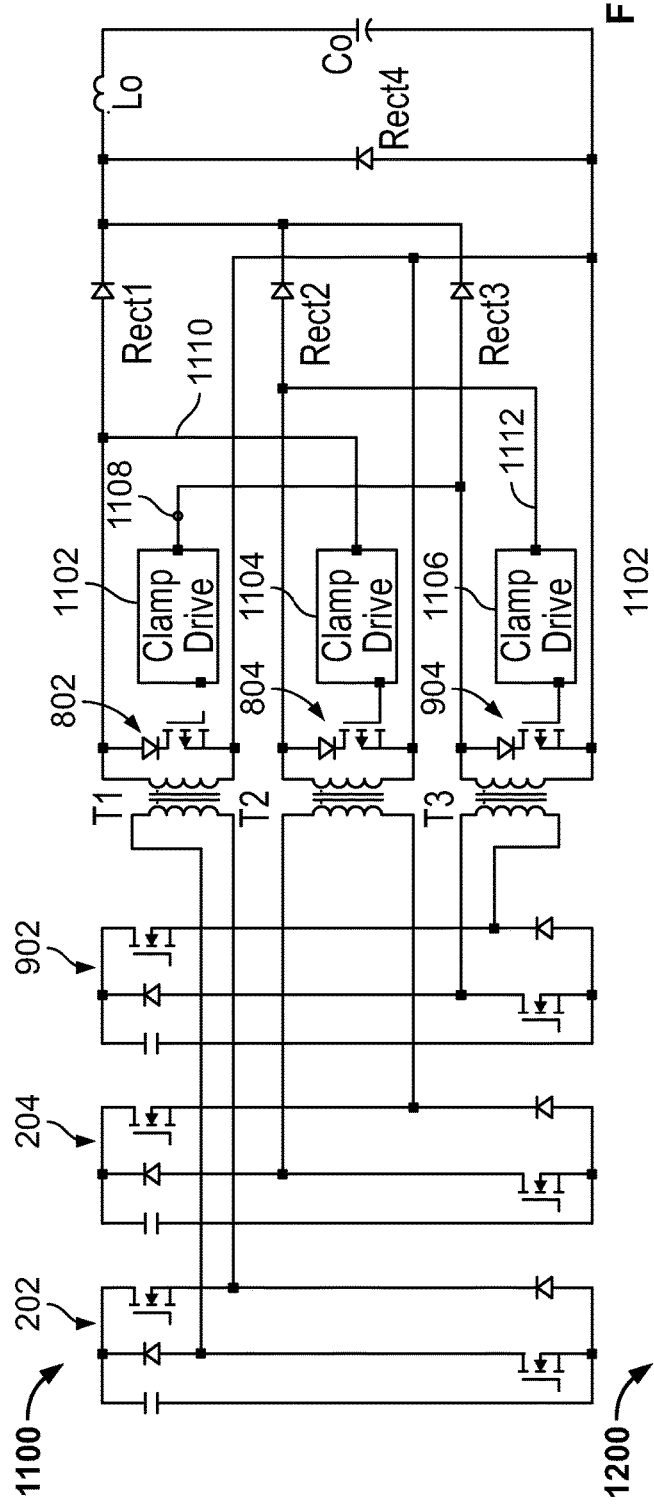
FIG. 11 is a circuit diagram of a multiphase interleaved forward power converter including three subconverters and three clamping circuits each coupled to a secondary transformer winding of the subconverters and controlled based on a secondary side voltage signal according to another example embodiment.

Additionally and/or alternatively, control signal(s) generated for a switching device of one clamping circuit may be based on a voltage of a subconverter not associated with that switching device. For example, FIG. 11 illustrates another multiphase interleaved forward power converter 1100 similar to the forward power converter 900 of FIG. 9. The forward power converter 1100 includes the clamping circuits 802, 804, 904 coupled across the secondary winding of the transformers T1, T2, T3 of the subconverters 202, 204, 902, respectively. Each clamping circuit 802, 804, 904 has a switching device and a diode coupled to the switching device as explained above.

The forward power converter 1100 further includes clamp drive circuits 1102, 1104, 1106 for controlling the switching device of the clamping circuits 802, 804, 904, respectively. Thus, the clamp drive circuit 1102, for example, may close the switching device of the clamping circuit 802 to create a current path for that clamping circuit as explained above.

As shown in FIG. 11, each clamp drive circuit 1102, 1104, 1106 receives a voltage from a subconverter not associated with that clamp drive circuit. The voltages may be, for example, sensed by any suitable voltage sensing device.

For example, the clamp drive circuit 1102 receives a voltage (represented by a signal 1108) from the secondary side of the transformer T3 of the subconverter 902, the clamp drive circuit 1104 receives a voltage (represented by a signal 1110) from the secondary side of the transformer T1 of the subconverter 202, and the clamp drive circuit 1106 receives a voltage (represented by a signal 1112) from the secondary side of the transformer T2 of the subconverter 204. Because the voltage is obtained from the secondary side of the transformers, the voltage signals provided to the clamp drive circuits 1102, 1104, 1106 do not have to pass through isolation components.

Figure 12:
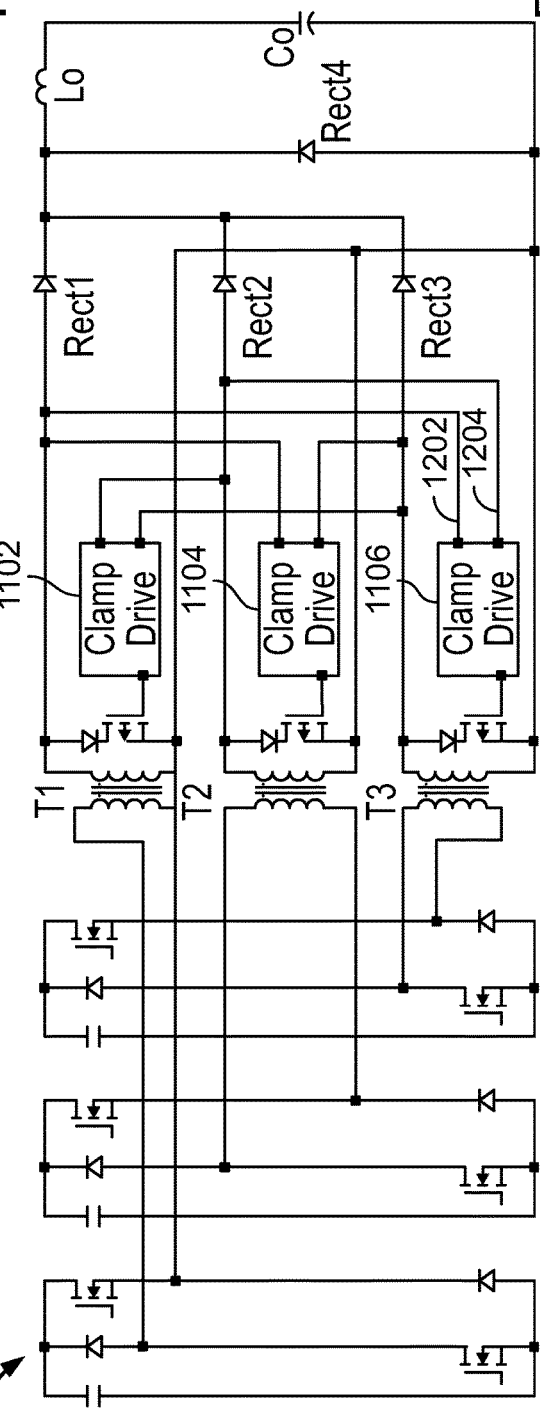
FIG. 12 is a circuit diagram of a multiphase interleaved forward power converter including three subconverters and three clamping circuits each coupled to a secondary transformer winding of the subconverters and controlled based on two secondary side voltage signals according to yet another example embodiment.

FIG. 12 illustrates a multiphase interleaved forward power converter 1200 similar to the forward power converter 1100 of FIG. 11, but where each clamp drive circuit 1102, 1104, 1106 receives a voltage input from two subconverters not associated with that clamp drive circuit. For example, and as shown in FIG. 12, the clamp drive circuit 1106 receives a voltage (represented by a signal 1202) from the secondary side of the transformer T1 of the subconverter 202 and a voltage (represented by a signal 1204) from the secondary side of the transformer T2 of the subconverter 204. The clamp drive circuits 1102, 1104 receive similar voltage inputs from its from non-associated subconverters.

Although the forward power converters of FIGS. 8-12 illustrate clamping circuits coupled to a secondary transformer winding, it should be understood that one or more of the clamping circuits of FIGS. 8-12 may be coupled to another suitable transformer winding including, for example, an auxiliary winding. For example, FIGS. 13 and 14 illustrate multiphase interleaved forward power converters 1300, 1400 similar to the forward power converter 1000 of FIG. 10 and the forward power converter 1100 of FIG. 11, but with its clamping circuits coupled across a secondary side auxiliary winding instead of a secondary transformer winding.

Figure 13:
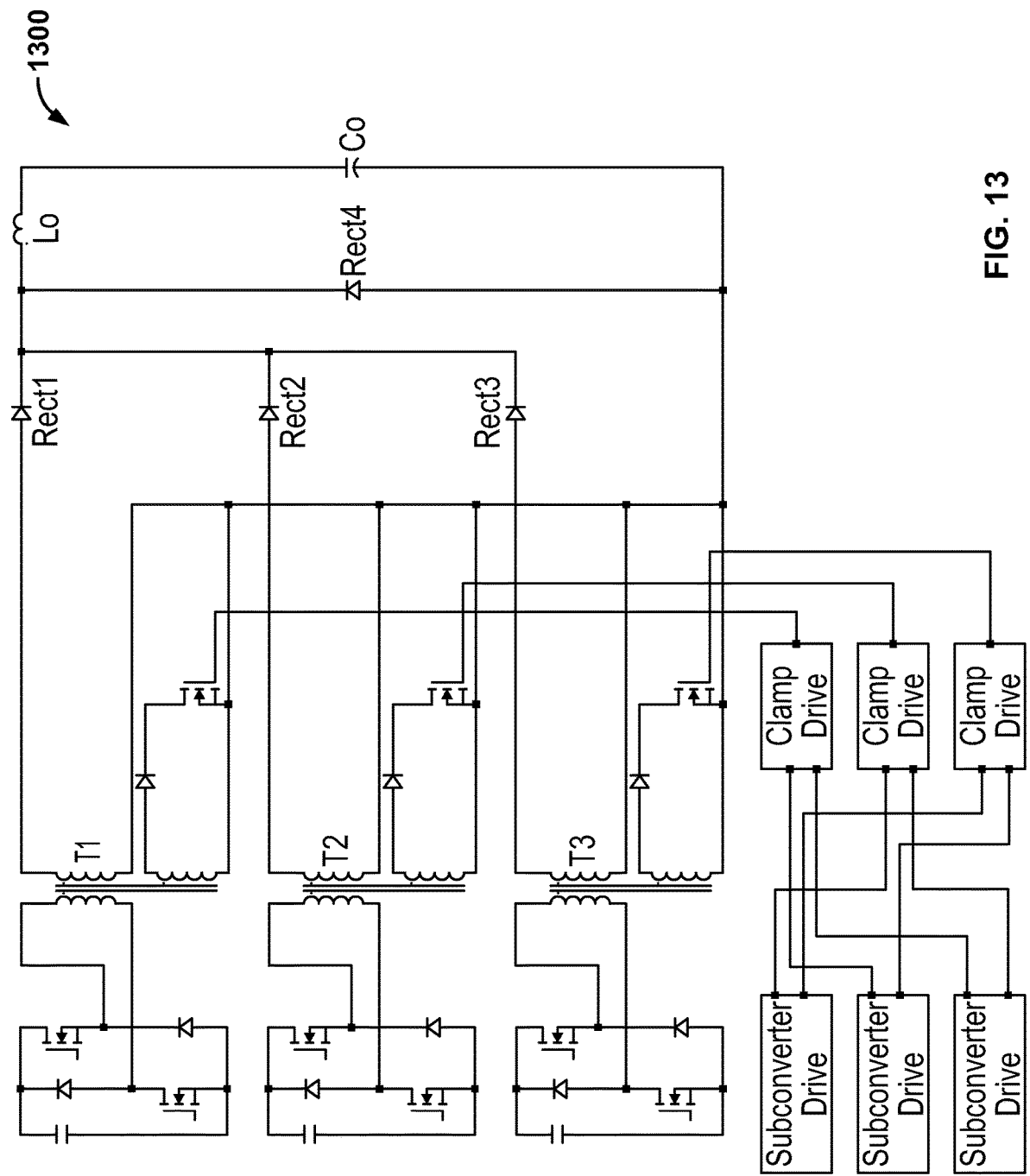
FIG. 13 is a circuit diagram of a multiphase interleaved forward power converter similar to the forward power converter 10, but where the clamping circuits are coupled to secondary side auxiliary transformer windings of the subconverters according to another example embodiment.
Figure 14:
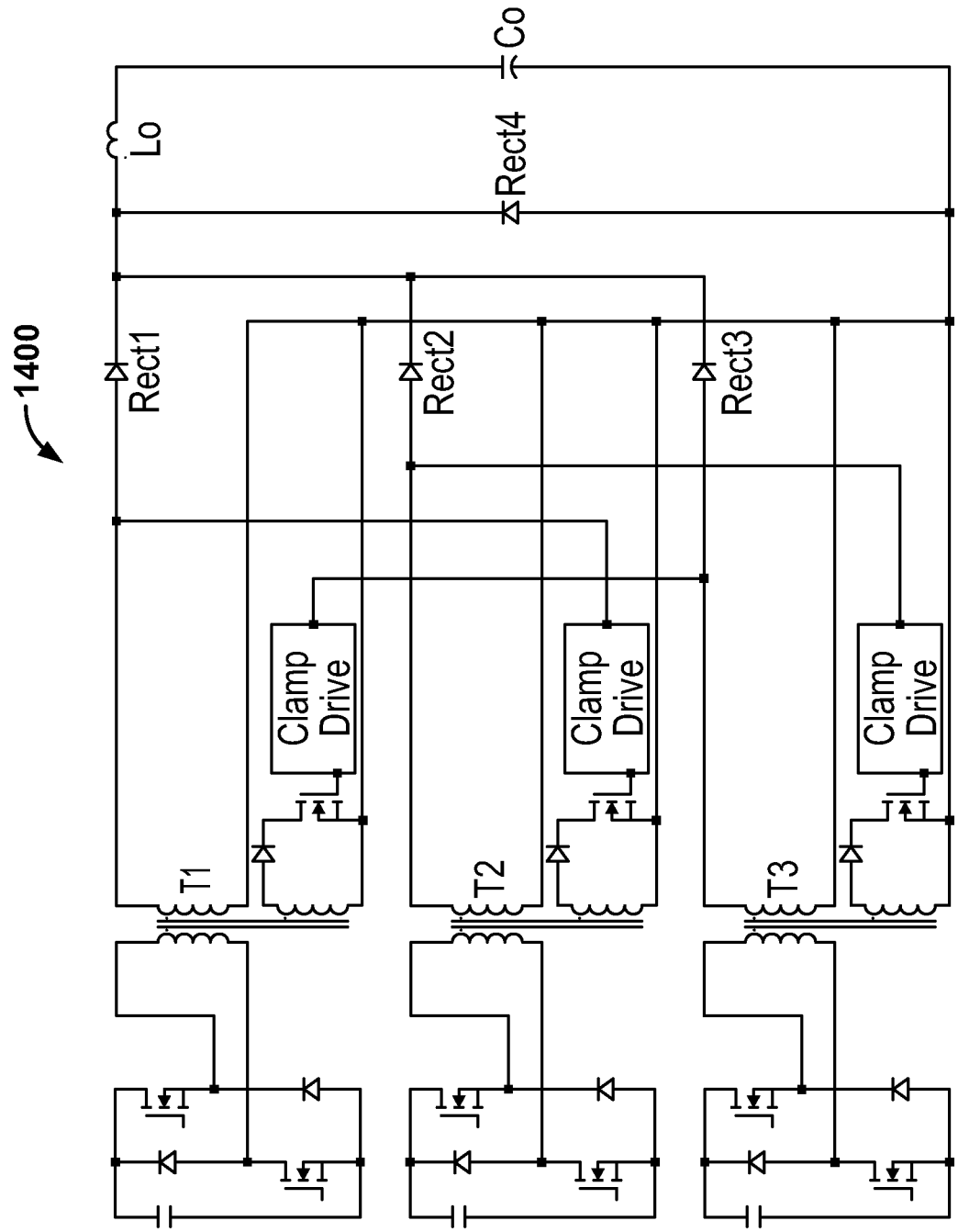
FIG. 14 is a circuit diagram of a multiphase interleaved forward power converter similar to the forward power converter 12, but where the clamping circuits are coupled to secondary side auxiliary transformer windings of the subconverters according to another example embodiment.
Figure 15:
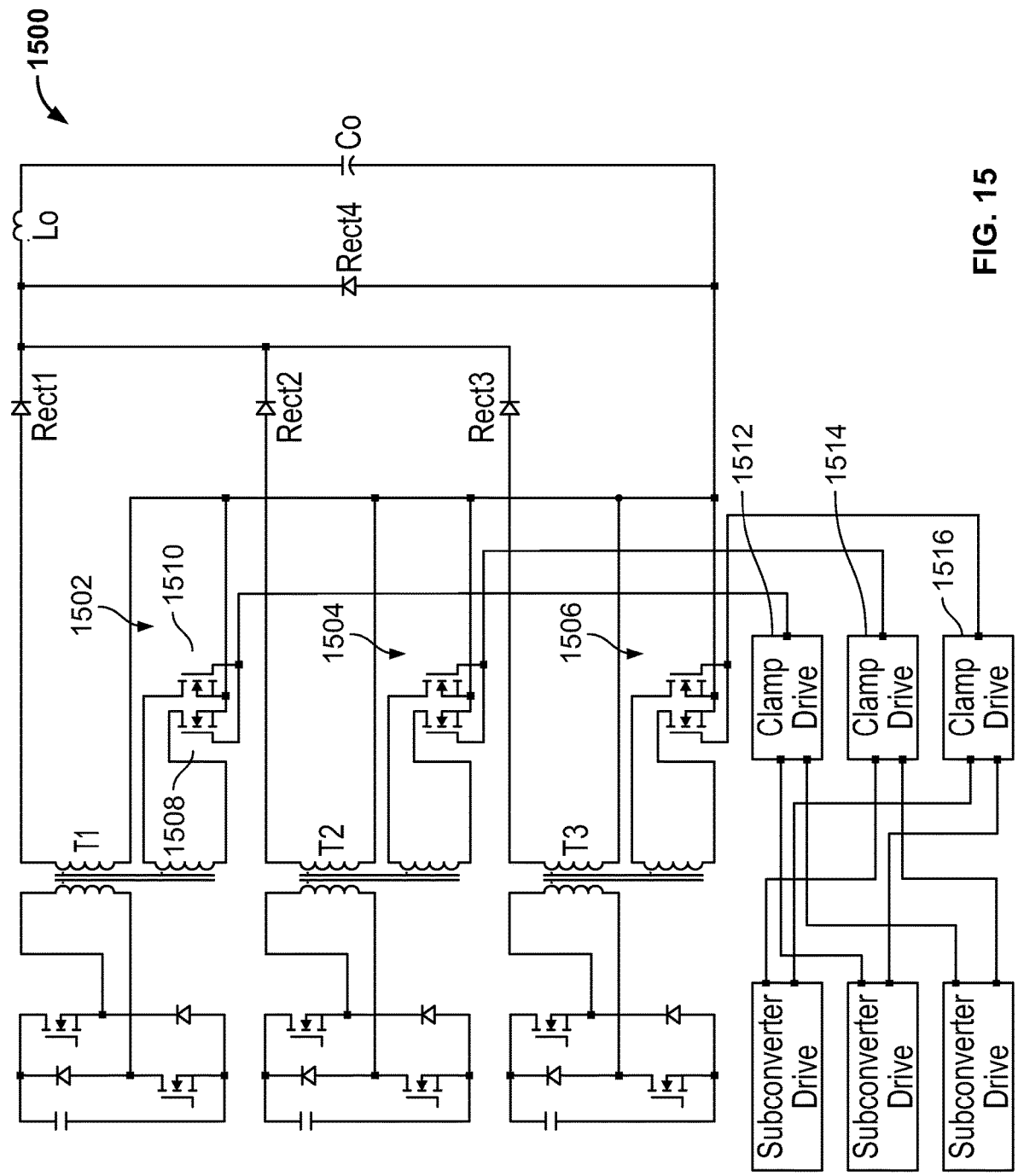
FIG. 15 is a circuit diagram of a multiphase interleaved forward power converter including three subconverters and three clamping circuits each including two switching devices coupled to secondary side auxiliary transformer windings of the subconverters according to yet another example embodiment.

FIG. 15 illustrates another multiphase interleaved forward power converter 1500 similar to the forward power converter 1300 of FIG. 13, but having a different clamping circuit configuration. For example, the forward power converter 1500 includes clamping circuits 1502, 1504, 1506 each including two switching devices coupled together. The switching devices are coupled in series with a secondary side auxiliary winding of its associated transformer. For example, the clamping circuit 1502 includes switching devices 1508, 1510 coupled in the series with the secondary side auxiliary winding of the transformer T1 to create a current path as explained above. In the particular example of FIG. 15, the switching devices 1508, 1510 are MOSFETs, the drain terminals of the MOSFETs are coupled to opposing ends of the secondary side auxiliary winding of the transformer T1, and the source terminals of the MOSFETs are coupled together.

The forward power converter 1500 includes clamp drive circuits 1512, 1514, 1516 for controlling the switching devices of the clamping circuits 1502, 1504, 1506, respectively, as explained above. Thus, the clamp drive circuit 1512, for example, may control one or both of the switching devices 1508, 1510 to create a current path for the clamping circuit 1502 as explained above.

Additionally, and as shown in FIG. 15, each clamp drive circuit 1512, 1514, 1516 generates control signal(s) to control the switching devices of each clamping circuit 1502, 1504, 1506 based on signals from two subconverter drive circuits as explained above relative to FIGS. 10 and 13. Alternatively, it should be understood that one or more of the clamp drive circuits 1512, 1514, 1516 may generate control signal(s) to control the switching devices of each clamping circuit 1502, 1504, 1506 based on one subconverter drive circuit signal as explained above relative to FIG. 9.

Figure 16:
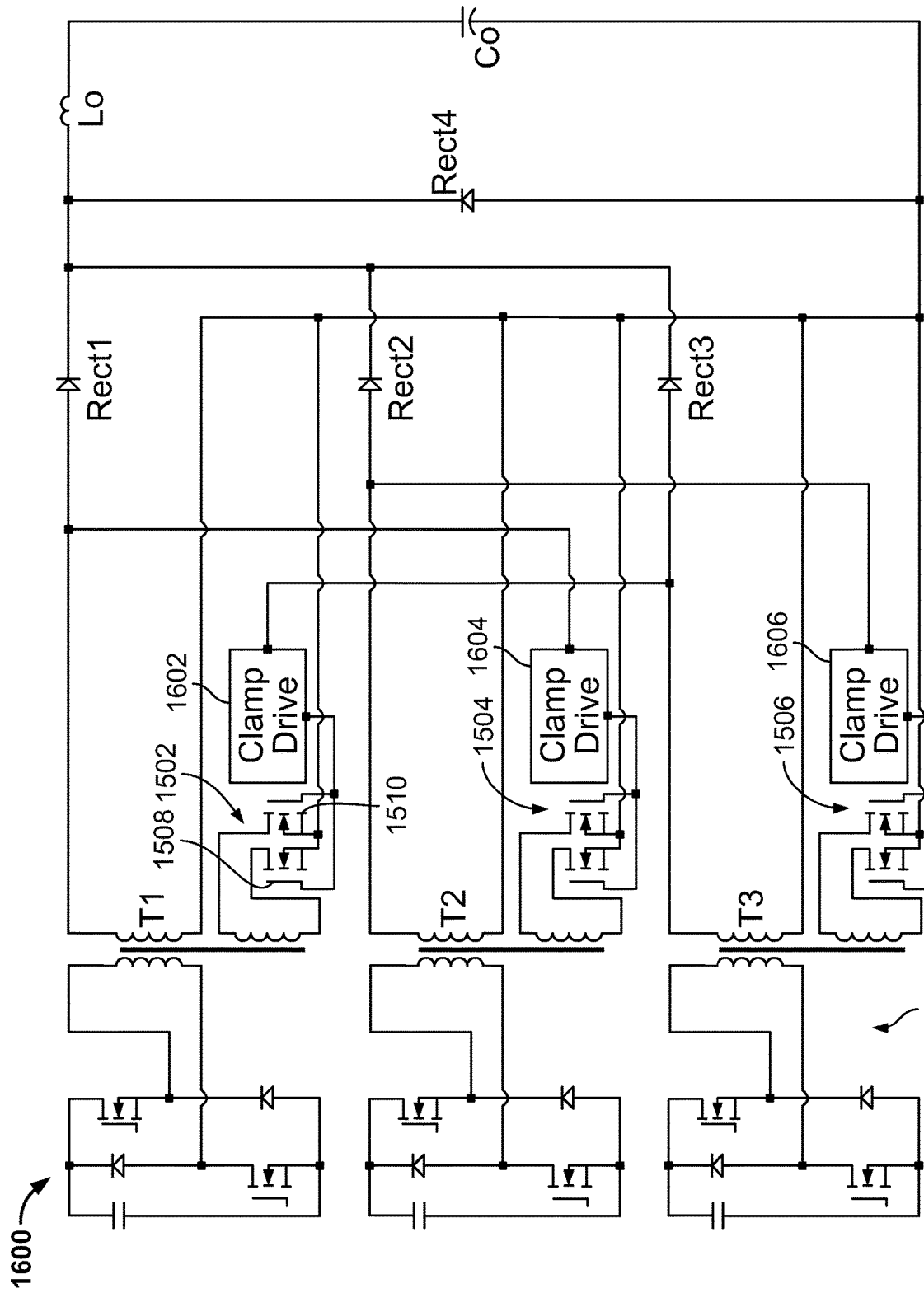
FIG. 16 is a circuit diagram of a multiphase interleaved forward power converter similar to the forward power converter 15, but where the clamping circuits are controlled based on a secondary side voltage signal according to another example embodiment.

FIG. 16 illustrates a multiphase interleaved forward power converter 1600 similar to the forward power converter 1500 of FIG. 15, but where the switching devices of each clamping circuit 1502, 1504, 1506 are controlled based on a voltage from one subconverter not associated with that clamp drive circuit as explained relative to FIGS. 11 and 14. For example, the forward power converter 1600 includes clamp drive circuits 1602, 1604, 1606 for controlling the switching devices of the clamping circuits 1502, 1504, 1506, respectively. As shown in FIG. 16, the switching devices 1508, 1510 of the clamping circuit 1502 are controlled based on a received voltage (e.g., a sensed voltage, etc.) from the secondary side of the transformer T3 of the subconverter 902. The switching devices of the other clamping circuits 1504, 1506 are controlled similarly, as explained above.

Alternatively, it should be understood that one or more of the clamp drive circuits 1602, 1604, 1606 may generate control signal(s) to control the switching devices of each clamping circuit 1502, 1504, 1506 based on a voltage from two subconverters as explained relative to FIG. 12.

The clamp drive circuits of FIGS. 8-16 can include drive logic to derive a control signal for controlling switching devices of the clamping circuits. The drive logic can optimize control of the switching devices in conjunction with converter timing requirements for each subconverter.

Figure 20:
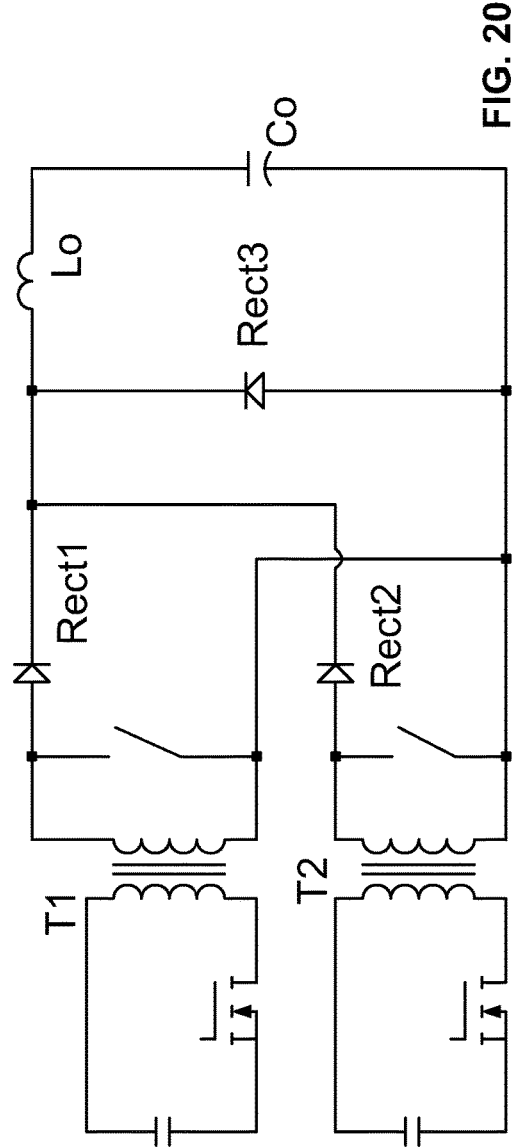
FIG. 20 is a circuit diagram of a multiphase interleaved forward power converter including two clamping circuits and two subconverters having a single switch forward converter topology according to another example embodiment.

Although FIGS. 2-16 illustrate each subconverter as including a two-switch forward converter topology, it should be understood that any other suitable forward converter topology including, for example, a single switch forward converter, etc. may be employed. For example, FIG. 20 illustrates a multiphase interleaved forward power converter 2000 similar to the forward power converter 200 of FIG. 2, but including two subconverters each having a single switch forward converter topology.

Additionally, although FIGS. 1-16 and 20 illustrate each subconverter including one switching circuit, it should be understood that one or more of the subconverters may include multiple switching circuits. For example, FIG. 21 illustrates a multiphase interleaved forward power converter 2100 substantially similar to the multiphase interleaved forward power converter 700 of FIG. 7, but including two switching circuits per subconverter.

Figure 21:
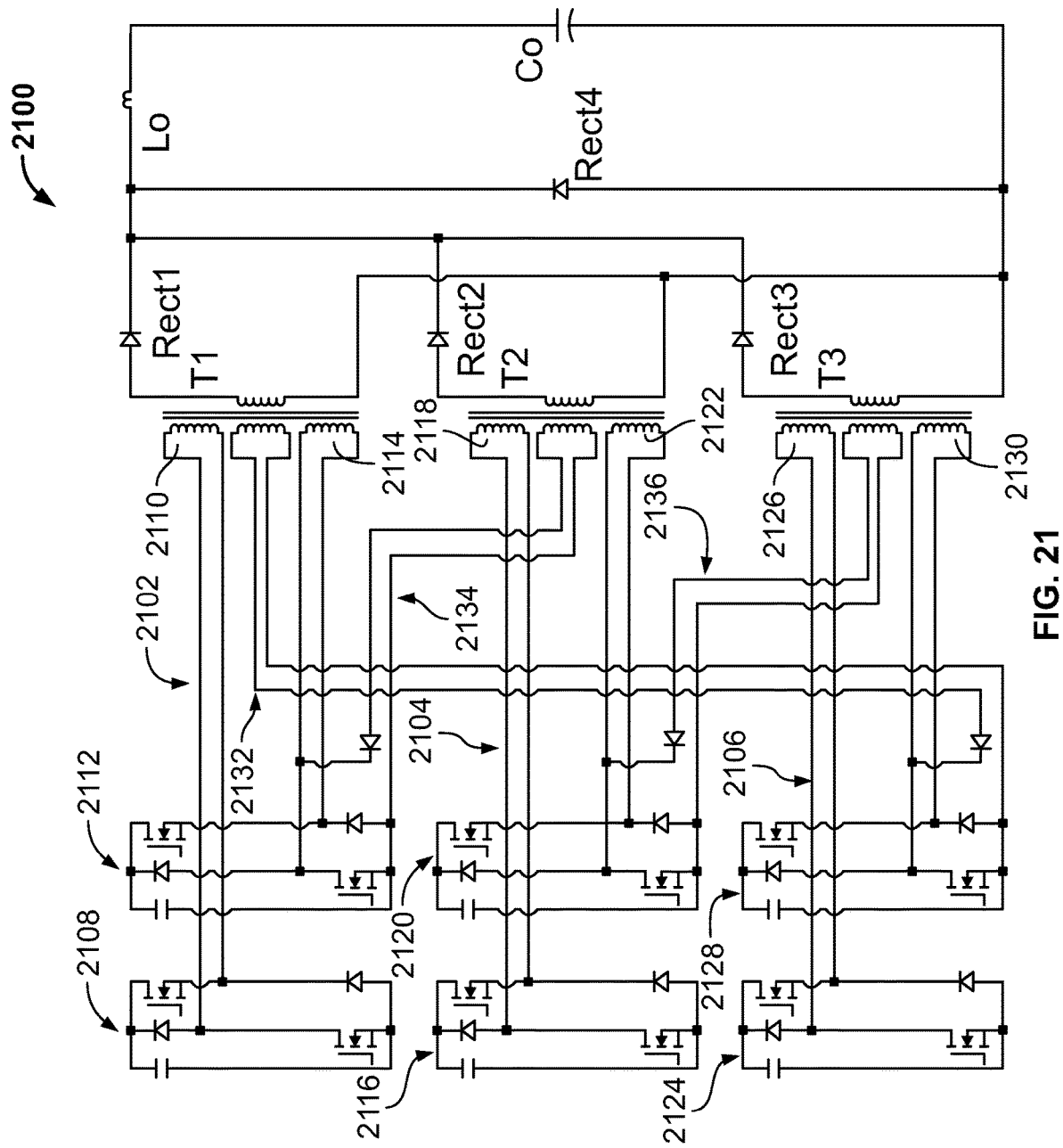
FIG. 21 is a circuit diagram of a multiphase interleaved forward power converter similar to the forward power converter of FIG. 7, but including multiple switching circuits per subconverter according to yet another example embodiment.

In particular, and as shown in FIG. 21, the interleaved forward power converter 2100 includes three subconverters 2102, 2104, 2106 each including two switching circuits and a transformer T1, T2, T3 having multiple primary windings. Each switching circuit has a two-switch forward converter topology.

The subconverter 2102 includes a switching circuit 2108 coupled to a primary winding 2110 of the transformer T1 and a switching circuit 2112 coupled to a primary winding 2114 of the transformer T1. Likewise, the subconverter 2104 includes a switching circuit 2116 coupled to a primary winding 2118 of the transformer T2 and a switching circuit 2120 coupled to a primary winding 2122 of the transformer T2. The subconverter 2106 includes a switching circuit 2124 coupled to a primary winding 2126 of the transformer T3 and a switching circuit 2128 coupled to a primary winding 2130 of the transformer T3.

As shown in FIG. 21, the forward power converter 2100 also includes three clamping circuits 2132, 2134, 2136 substantially similar to the clamping circuits 704, 706, 708 of FIG. 7. For example, the clamping circuits 2132, 2134, 2136 each utilize an auxiliary winding of one transformer T1, T2, T3, a diode, and a primary side power switch of one of the switching circuits to function as explained herein.

The multiphase interleaved forward power converters disclosed herein may include an inductor coupled to the outputs of each subconverter. For example, and as shown in FIGS. 2-21, each multiphase interleaved forward power converter includes an inductor Lo coupled between an output capacitor Co (e.g., representing a load) and the output of each subconverter.

As shown in FIGS. 2-21, the collective outputs of each subconverter are coupled together in parallel to form an output stage of the forward power converters having a positive output terminal and a reference output terminal. For example, the inductor Lo of FIGS. 2-16 and 18-21 is coupled to the positive output terminal. Additionally and/or alternatively, any one of these inductors Lo may be coupled to the reference output terminal. For example, FIG. 17 illustrates a multiphase interleaved forward power converter 1700 similar to the forward power converter 200 of FIG. 2, but where the inductor Lo is coupled to a reference output terminal. In particular, the subconverters 202, 204 include a positive output terminal 1702 and a reference output terminal 1704. As shown in FIG. 17, the inductor Lo coupled to the reference output terminal 1704.

The inductors Lo disclosed herein may be one inductor, more than one inductor if the inductors conduct during substantially the same time period, more than one inductor if the inductors are magnetically and/or electrically coupled together, etc. The inductor Lo may include the inductance of the inductor itself, parasitic inductance of other components (e.g., wires, etc.), etc.

Additionally, the multiphase interleaved forward power converters may include a rectification circuit coupled to the outputs of the subconverters. For example, and as shown in FIGS. 2-18, 20 and 21, the rectification circuit disclosed herein may include two or more forward rectifiers (e.g., the rectifiers Rect1, Rect2 of FIGS. 2-6, 8, 17, 18 and 20, the rectifiers Rect1, Rect2, Rect3 of FIGS. 7, 9-16 and 21, etc.) and a freewheeling rectifier (e.g., the rectifier Rect3 of FIGS. 2-6, 8, 17, 18 and 20, the rectifier Rect4 of FIGS. 7, 9-16 and 21, etc.).

As shown in FIGS. 2-17, 20 and 21, each of the forward rectifiers are coupled together in a common cathode configuration. That is, the cathodes of the forward rectifiers of FIGS. 2-17, 20 and 21 are coupled together. Alternatively, the anodes of the forward rectifiers disclosed herein may be coupled together to form a common anode configuration. For example, FIG. 18 illustrates a multiphase interleaved forward power converter 1800 similar to the forward power converter 200 of FIG. 2, but where the anodes of the forward rectifiers Rect1, Rect2 are coupled together.

Figure 19:
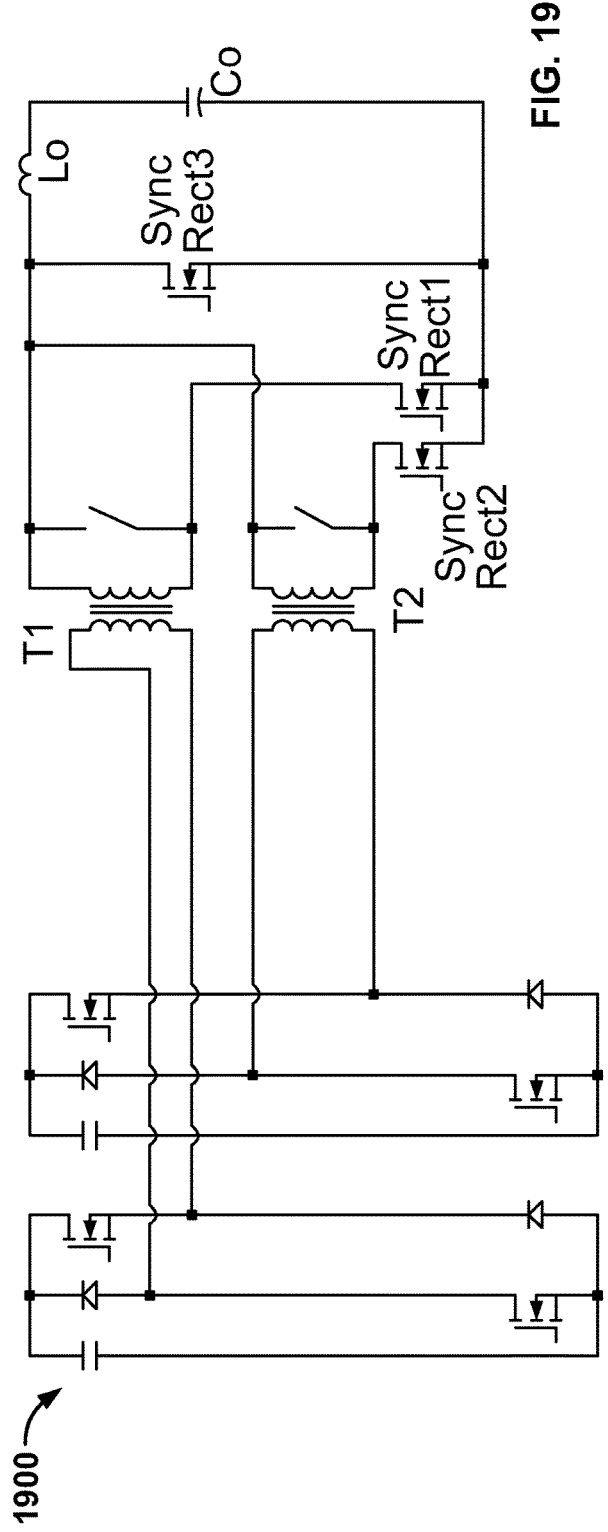
FIG. 19 is a circuit diagram of a multiphase interleaved forward power converter including a rectification circuit having synchronous rectifiers according to yet another example embodiment.

Additionally and/or alternatively, the rectification circuits disclosed herein may include other suitable rectifiers including, for example, one or more synchronous rectifiers. For example, FIG. 19 illustrates a multiphase interleaved forward power converter 1900 similar to the forward power converter 200 of FIG. 2, but including synchronous rectifiers sync rect1, sync rect2, sync rect3.

Further, the switching devices disclosed herein can be any suitable component that breaks an electrical circuit. For example, the switching devices may be diodes (e.g., as shown in FIG. 5), switches such as transistors (e.g., MOSFETs, etc.), etc.

The multiphase interleaved forward power converters disclosed herein may be powered by one or more power sources. For example, the power source(s) may include a single front end rectifier, a multi-level front end rectifier, a power factor correction (PFC) converter, etc. The power source(s) may provide 230 VAC, 380 VAC, 480 VAC, 660 VAC, 690 VAC and/or another suitable voltage. The power source(s) may be a single-phase source or a polyphase source such as a three-phase source, etc.

Figure 22E:
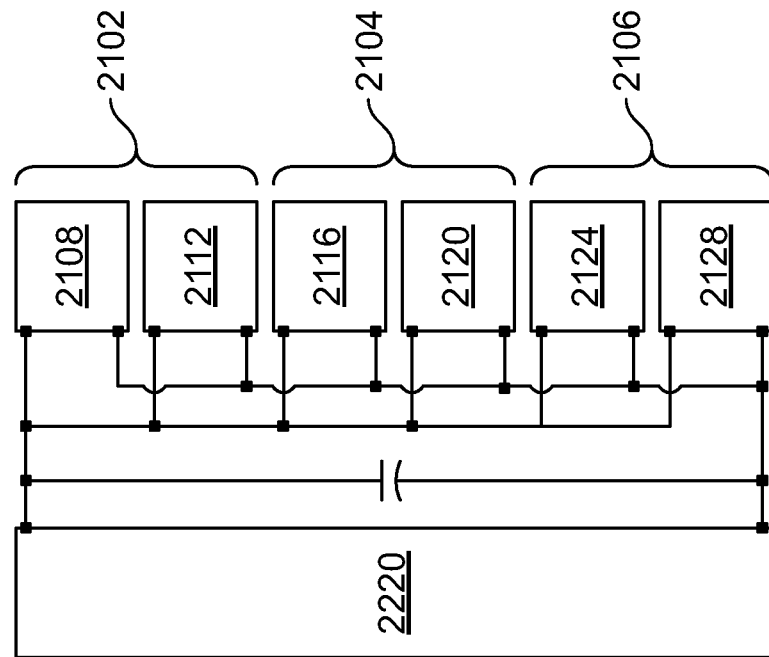

For example, FIGS. 22A-22E illustrate the subconverters 2102, 2104, 2106 of the forward power converter 2100 of FIG. 21 coupled to one or more power sources. In particular, FIG. 22A illustrates the switching circuits 2108, 2112, 2116, 2120, 2124, 2128 of FIG. 21 each powered individually by its own power source 2202, 2204, 2206, 2208, 2210, 2212, respectively. Thus, each switching circuit is powered by a different power source.

FIGS. 22B and 22C illustrate the switching circuits 2108, 2112 (e.g., the subconverter 2102) powered by one power source 2214, the switching circuits 2116, 2120 (e.g., the subconverter 2104) powered by one power source 2216, and the switching circuits 2124, 2128 (e.g., the subconverter 2106) powered by one power source 2218. As shown in FIG. 22B, the switching circuits of each subconverter are coupled in series with its particular power source. Alternatively, and as shown in FIG. 22C, the switching circuits of each subconverter can be coupled in parallel with its particular power source.

Figure 22D:
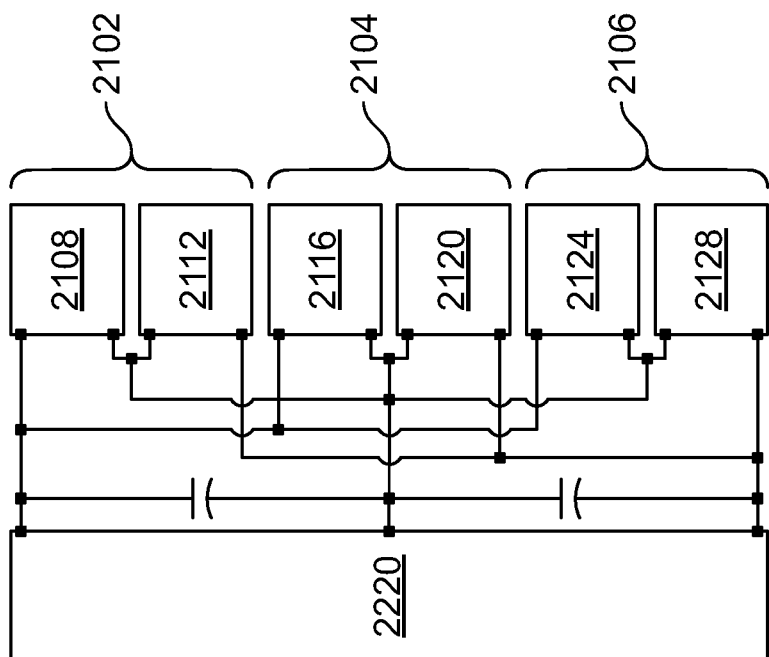

FIGS. 22D and 22E illustrate the switching circuits 2108, 2112, 2116, 2120, 2124, 2128 of FIG. 21 all powered by one power source 2220. The switching circuits of FIG. 22D are coupled in series with the power source 2220 while the switching circuits of FIG. 22E are coupled in parallel with the power source 2220.

Figure 23:
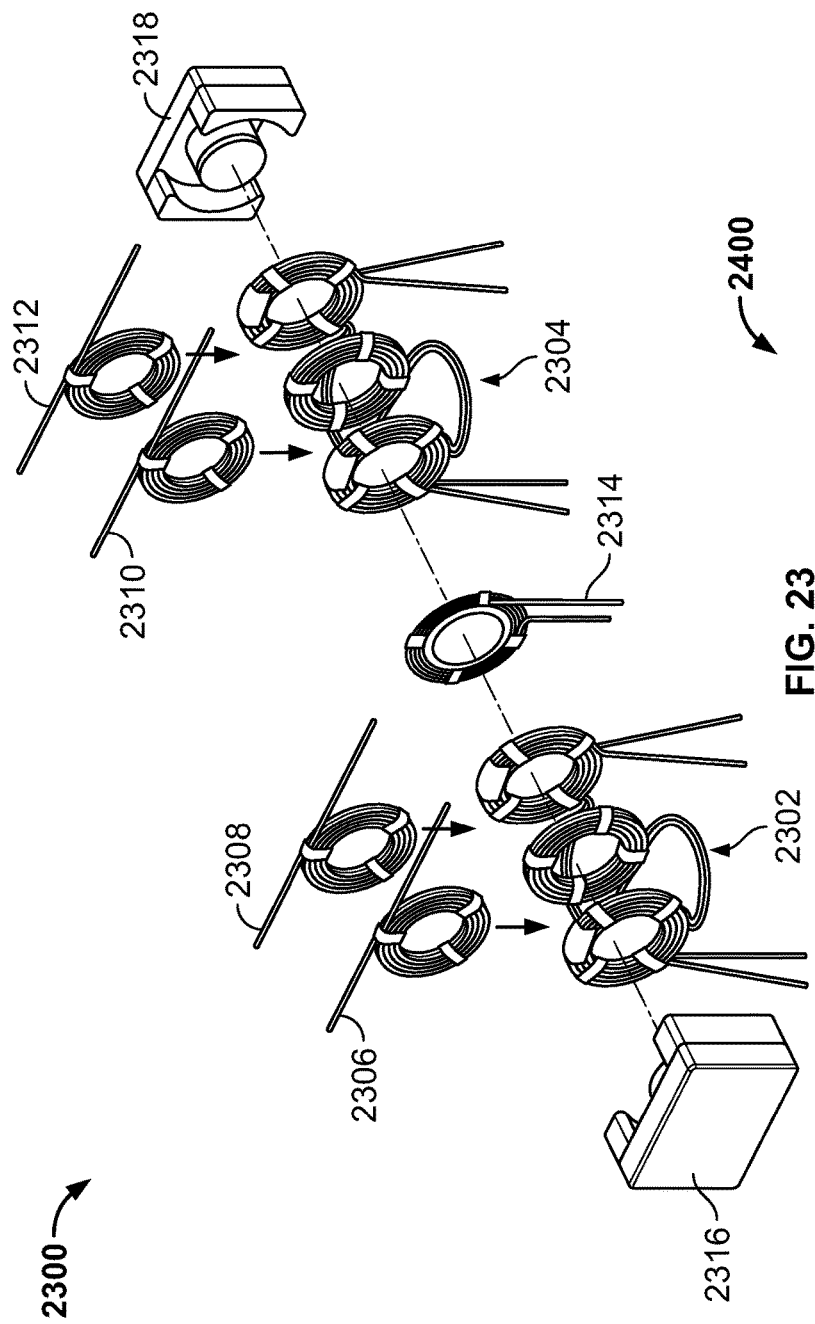
FIG. 23 is an exploded isometric view of a transformer employable in the forward power converter of FIG. 21, according to yet another example embodiment.

The transformers disclosed herein may include any suitable primary winding configuration, secondary winding configuration, and/or core configuration. For example, FIG. 23 illustrates a transformer 2300 including two sets of primary windings 2302, 2304, four sets of secondary windings 2306, 2308, 2310, 2312, an auxiliary winding 2314 positioned between the two sets of primary windings 2302, 2304, and two "E" shaped core sections 2316, 2318. The secondary windings 2306, 2308, 2310, 2312 can be coupled in series, in parallel, and/or a combination of both depending on the desired output. The transformer 2300 of FIG. 23 may experience good magnetic coupling and reduced leakage inductance due to the multiple primary and secondary winding configuration.

The primary windings of FIG. 23 may be bifilar primary windings (as shown) and/or another suitable primary winding configuration if desired. The secondary windings of FIG. 23 may be formed of a wire conductor (as shown), a copper plate (e.g., for high current applications), and/or another suitable secondary winding configuration if desired.

The transformer 2300 may be employed as any one of the transformers T1, T2, T3 of FIG. 21. For example, one set of primary windings (e.g., the windings 2302) may couple to one switching circuit (e.g., the circuit 2108) of FIG. 21 and the other set of primary windings (e.g., the windings 2304) may couple to another switching circuit (e.g., the circuit 2112) of FIG. 21. The auxiliary winding 2314 may be part of one of the clamping circuits (e.g., the clamping circuit 704) of FIG. 21. The secondary windings 2306, 2308, 2310, 2312 may collectively represent the secondary winding of the transformers T1, T2, T3 of FIG. 21.

In such examples, the switching circuits coupled to the sets of primary windings 2302, 2304 experience good power sharing (e.g., balancing) due to the common transformer 2300 shared between the switching circuits. Additionally, the transformer 2300 achieves a compact and high-power density design that saves space in power supplies compared to other transformer configurations not including such features.

Figure 24:
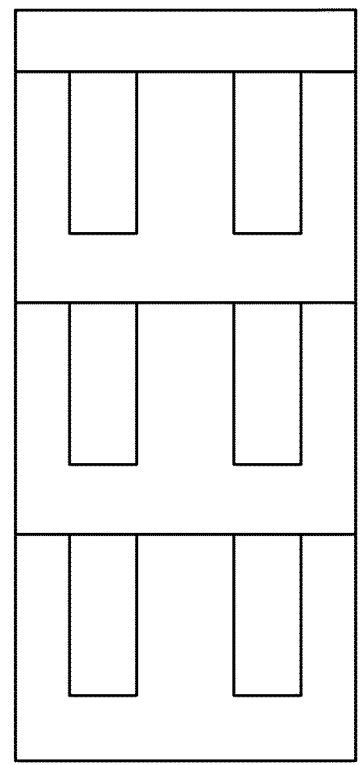
FIG. 24 is a top view of a transformer core for a three-phase interleaved forward converter according to another example embodiment.

Further, windings of each of the transformers (e.g., the transformers T1, T2 of FIGS. 2-6, 8, 17, 18 and 20, the transformers T1, T2, T3 of FIGS. 7, 9-16 and 21, etc.) may be placed on one transformer core configuration. For example, FIG. 24 illustrates an example transformer core 2400 for a three phase interleaved forward converter, such as the forward converters of FIGS. 7, 9-16 and 21. As shown, the transformer core 2400 includes three "E" shaped core sections and an "I" shaped core section. Windings of each transformer (e.g., the transformers T1, T2, T3 of FIGS. 7, 9-16 and 21) can be placed on its own "E" shaped core section. As such, the transformers T1, T2, T3 may share the transformer core 2400.

For example, windings of one transformer can be wound about the middle leg of one "E" shaped core section and windings of windings of another transformer can be wound about the middle leg of another "E" shaped core section. In other examples, a transformer core may include two "E" shaped core sections and an "I" shaped core section for a two phase interleaved forward converter, such as the forward converters of FIGS. 2-6, 8, 17, 18 and 20. Such transformer core designs increase power density as compared to the transformer core of FIG. 23.

Additionally, although the multiphase interleaved forward power converters disclosed herein each include subconverters having the same topology and clamping circuits having the same configuration, it should be understood that different subconverters topologies and/or different clamping circuit configurations may be employed for each multiphase interleaved forward power converter. For example, any one of the multiphase interleaved forward power converters can include a subconverter having one topology, another subconverter having a different topology, a clamping circuit having one configuration, and/or another clamping circuit having a different configuration.

The multiphase interleaved forward power converters disclosed herein may be employed in various applications. For example, the forward power converters may be used in variable output voltage power supplies, constant current power supplies, etc. Additionally, the forward power converters can be used as (or at least part of) power supplies for computing applications (e.g., servers, etc.), telecommunications, automation applications, imaging devices (e.g., magnetic resonance imaging (MRI) devices, etc.), laser devices, medical/dental devices, semiconductor testing devices, etc.

By employing the clamping circuits disclosed herein, a resonance voltage may be substantially prevented from propagating in subconverters of multiphase interleaved forward power converters during the subconverters' idle period. For example, FIGS. 25-27 illustrate various waveforms of a drain to source voltage (Vds) of primary side switches of the forward power converters with and without resonance voltage. The conduction period, the reset period, and the idle period for one switching cycle are identified in FIG. 25 for each subconverter with respect to its voltage Vds waveform. For clarity, the conduction period, the reset period, and the idle period are identified in FIGS. 26 and 27 for one of the subconverters with respect to its voltage Vds waveform.

Figure 25A:
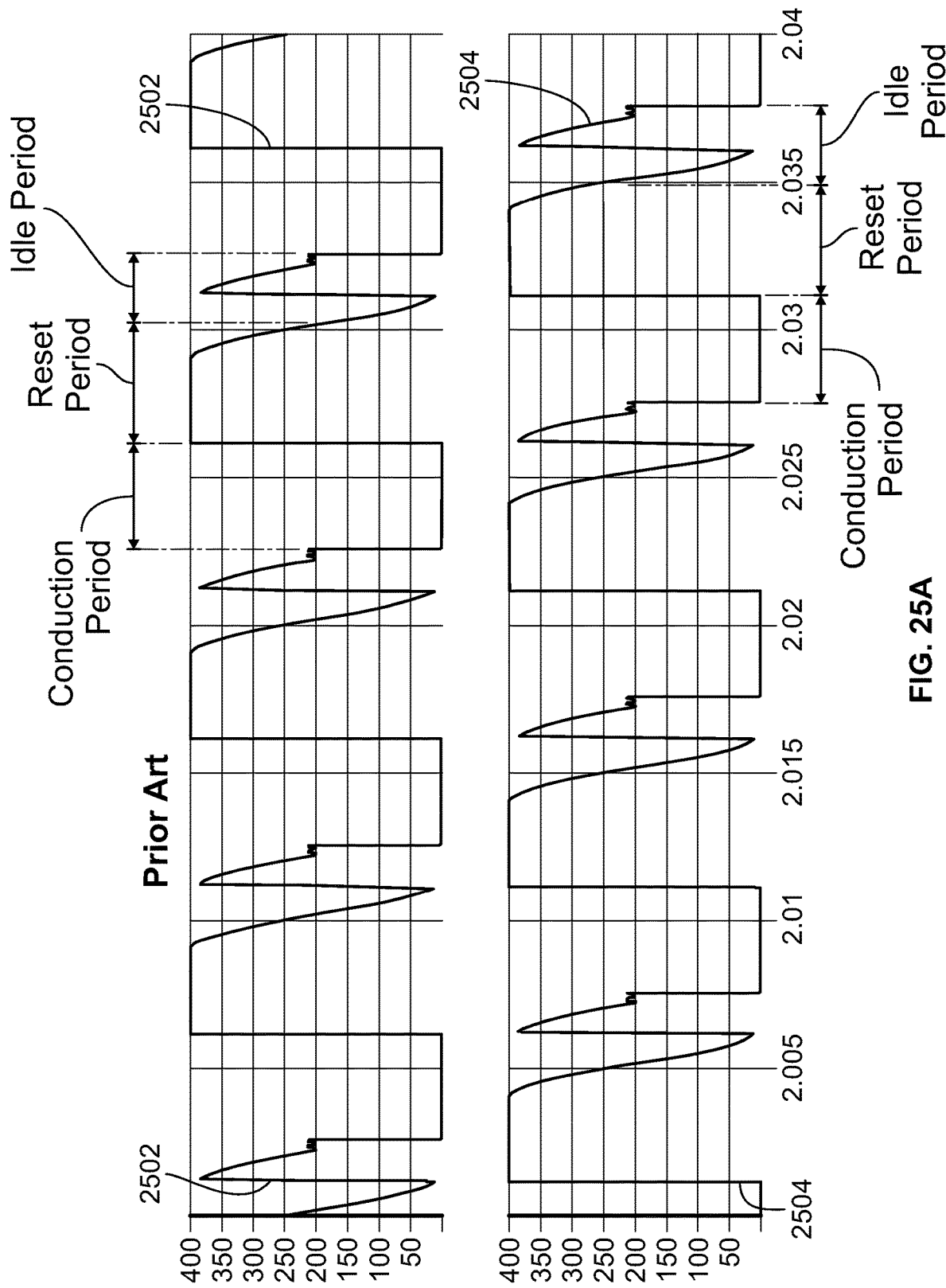
FIGS. 25A and 25B illustrate waveforms of a drain to source voltage of primary side switches of a conventional two phase interleaved forward power converter and a two-phase interleaved forward power converter including two clamping circuits according to yet another example embodiment.
Figure 25B:
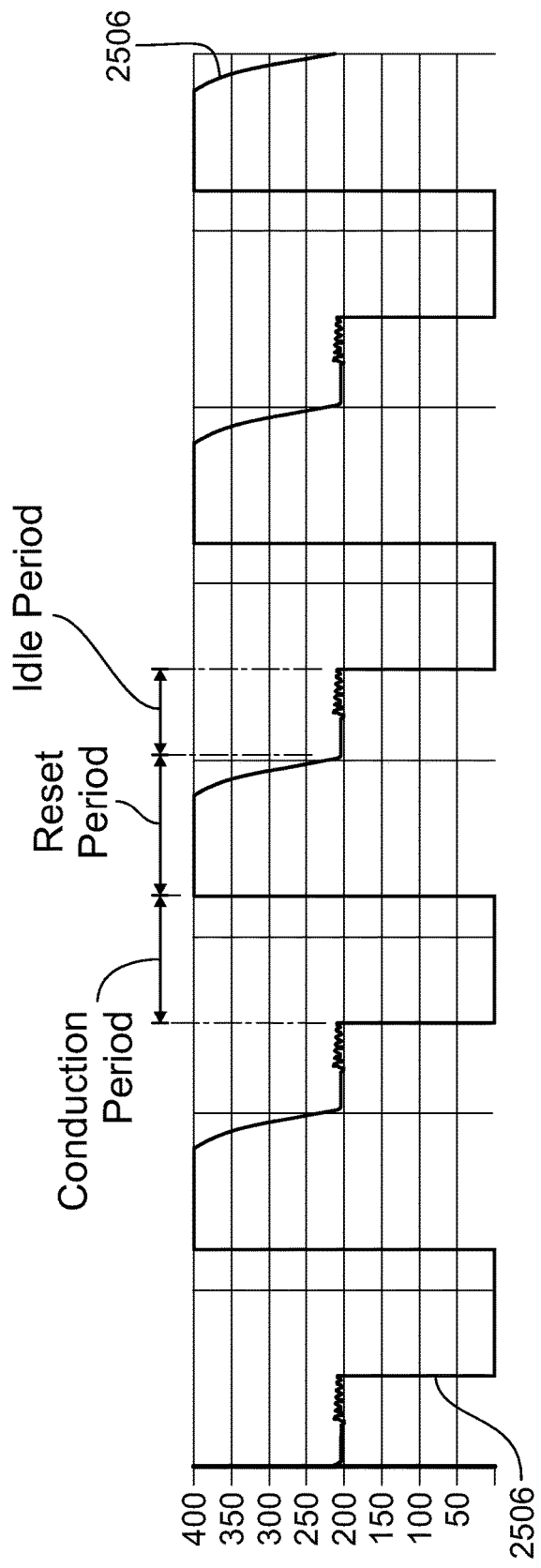
Figure 25B:
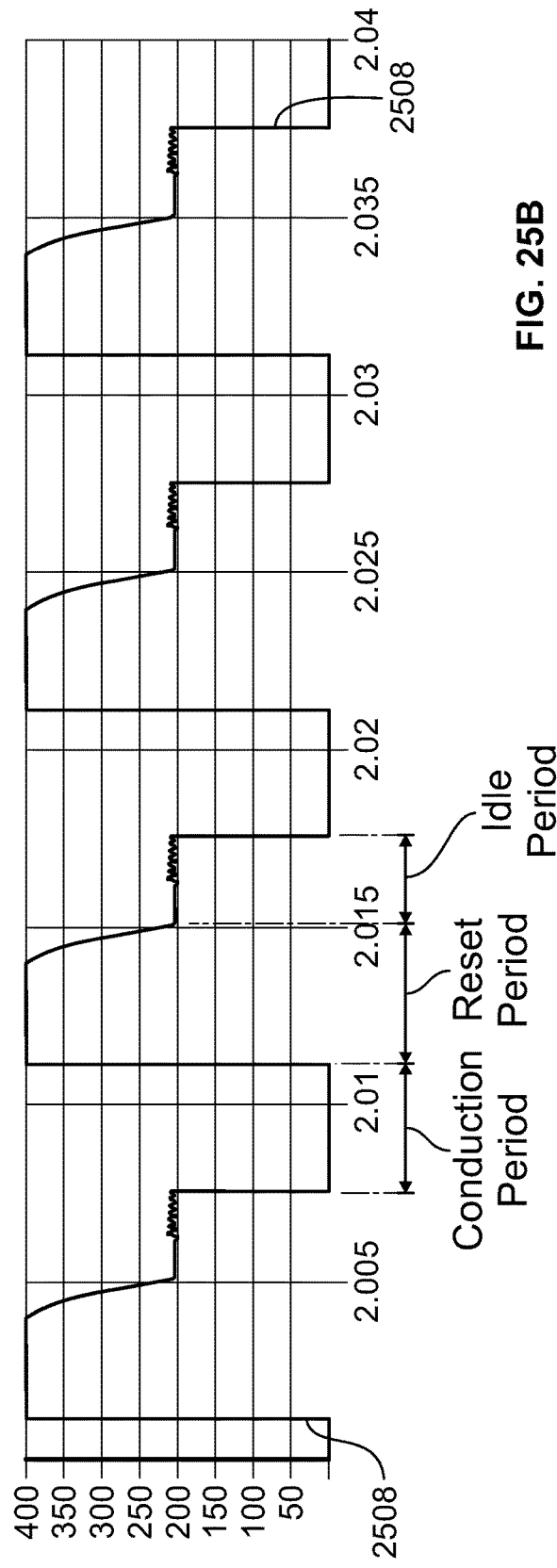

FIG. 25A illustrates a voltage Vds (represented by line 2502) of a primary side switch in one subconverter and a voltage Vds (represented by line 2504) of a primary side switch in another subconverter of a conventional multiphase interleaved forward power converter. In contrast, FIG. 25B illustrates a voltage Vds (represented by line 2506) of a primary side switch in one subconverter (e.g., the subconverter 202 of FIG. 2) and a voltage Vds (represented by line 2508) of a primary side switch in another subconverter (e.g., the subconverter 204 of FIG. 2) of a multiphase interleaved forward power converter having clamping circuits as disclosed herein. As shown in FIG. 25B, the conduction period of one of the subconverters is at least partially complementary to the idle period of the other subconverter.

As shown in FIG. 25A, a resonance voltage propagates through the primary side switches during the idle period of each subconverter causing the voltage Vds of the primary side switches to swing between about zero volts and about 400 volts (e.g., the input voltage). In contrast, by using the clamping circuits disclosed herein, a resonance voltage is substantially prevented from propagating through the primary side switches. Thus, as shown in FIG. 25B, the voltage Vds of the primary side switches remains steady at about 200 volts (e.g., about half the input voltage due to the two-switch forward converter topology with clamping circuits) during the idle period of each subconverter.

Figure 26A:
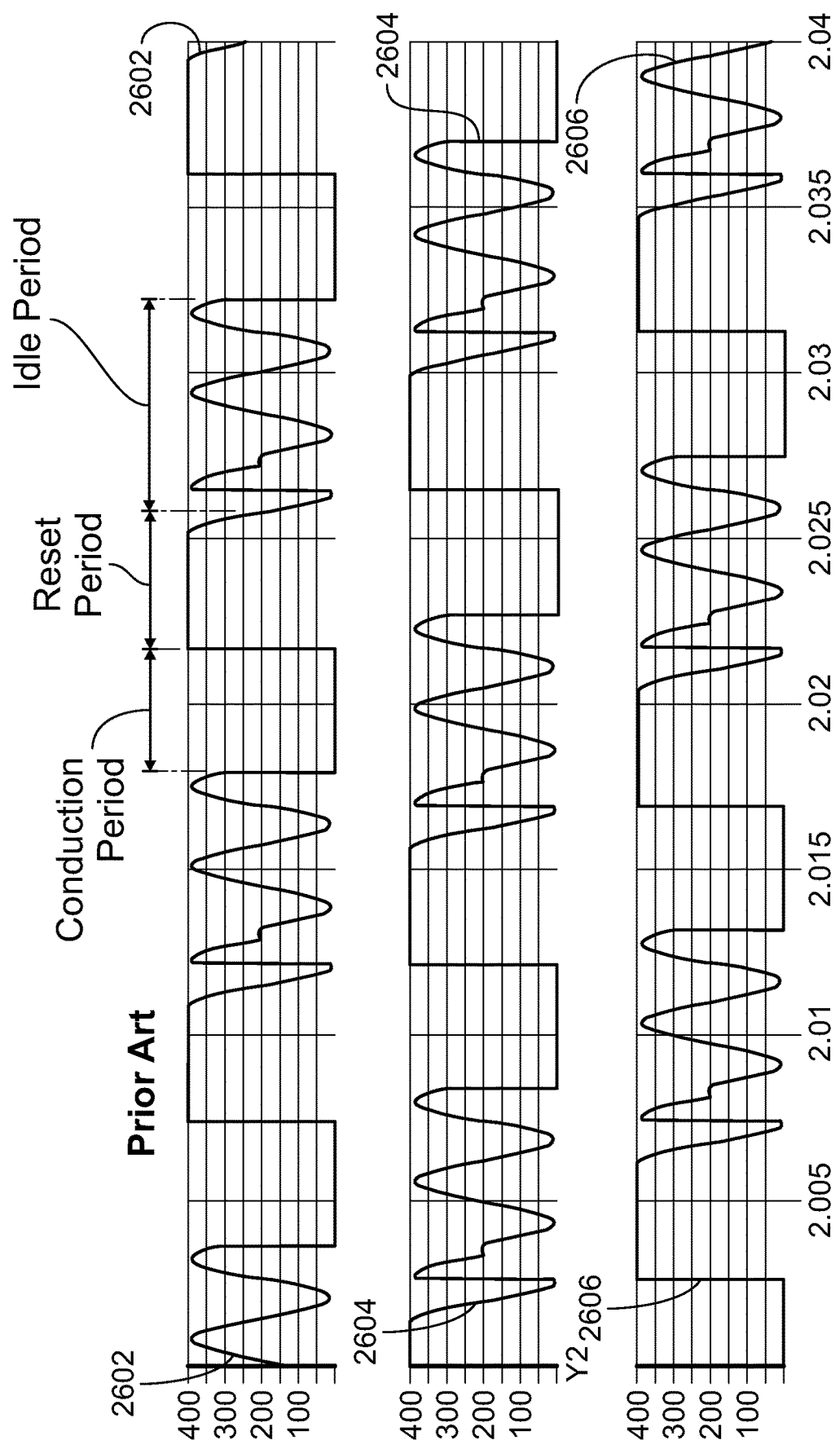
FIGS. 26A and 26B illustrate waveforms of a drain to source voltage of primary side switches of a conventional three phase interleaved forward power converter and a three phase interleaved forward power converter including three clamping circuits and experiencing a high idle time resonant frequency according to another example embodiment.
Figure 26B:
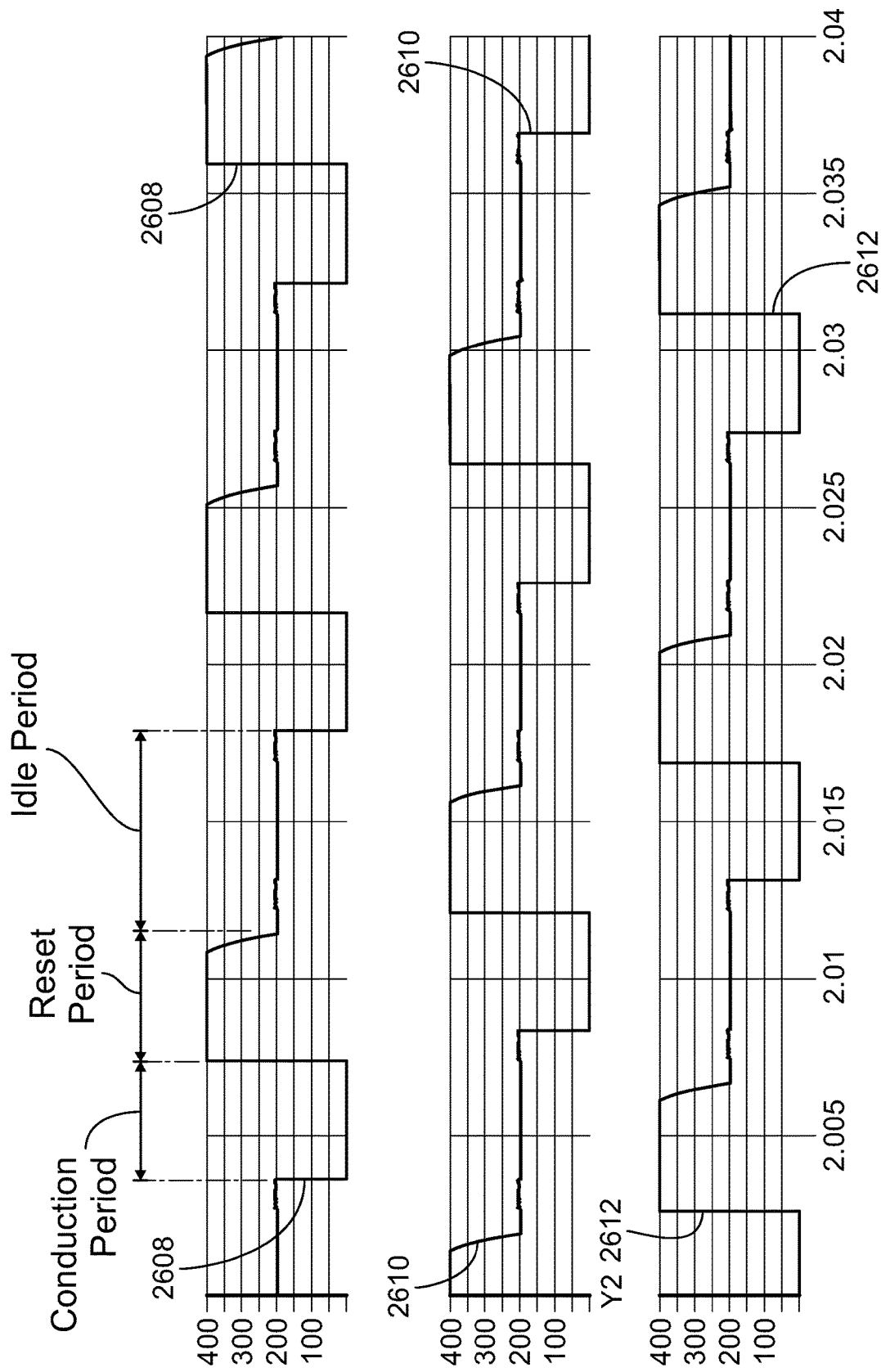

FIGS. 26A and 26B illustrate similar waveforms as FIGS. 25A and 25B, but for a multiphase interleaved forward power converter including three subconverters. In particular, FIG. 26A illustrates voltages Vds (represented by lines 2602, 2604, 2606) of a primary side switch in three subconverters of a conventional multiphase interleaved forward power converter. As shown in FIG. 26A, the voltage Vds swings between about zero volts and about 400 volts multiple times due to a higher idle time resonant frequency caused by a lower transformer leakage inductance and/or a lower switch capacitance as compared to, for example, the subconverters represented in FIG. 25.

In contrast, FIG. 26B illustrates voltages Vds (represented by lines 2608, 2610, 2612) of a primary side switch in three subconverters of a multiphase interleaved forward power converter having clamping circuits as disclosed herein. Like in the voltage waveforms of the FIG. 25B, the voltage Vds of the voltage waveforms of FIG. 26B remain steady at about 200 volts during the idle period of each subconverter.

Figure 27A:
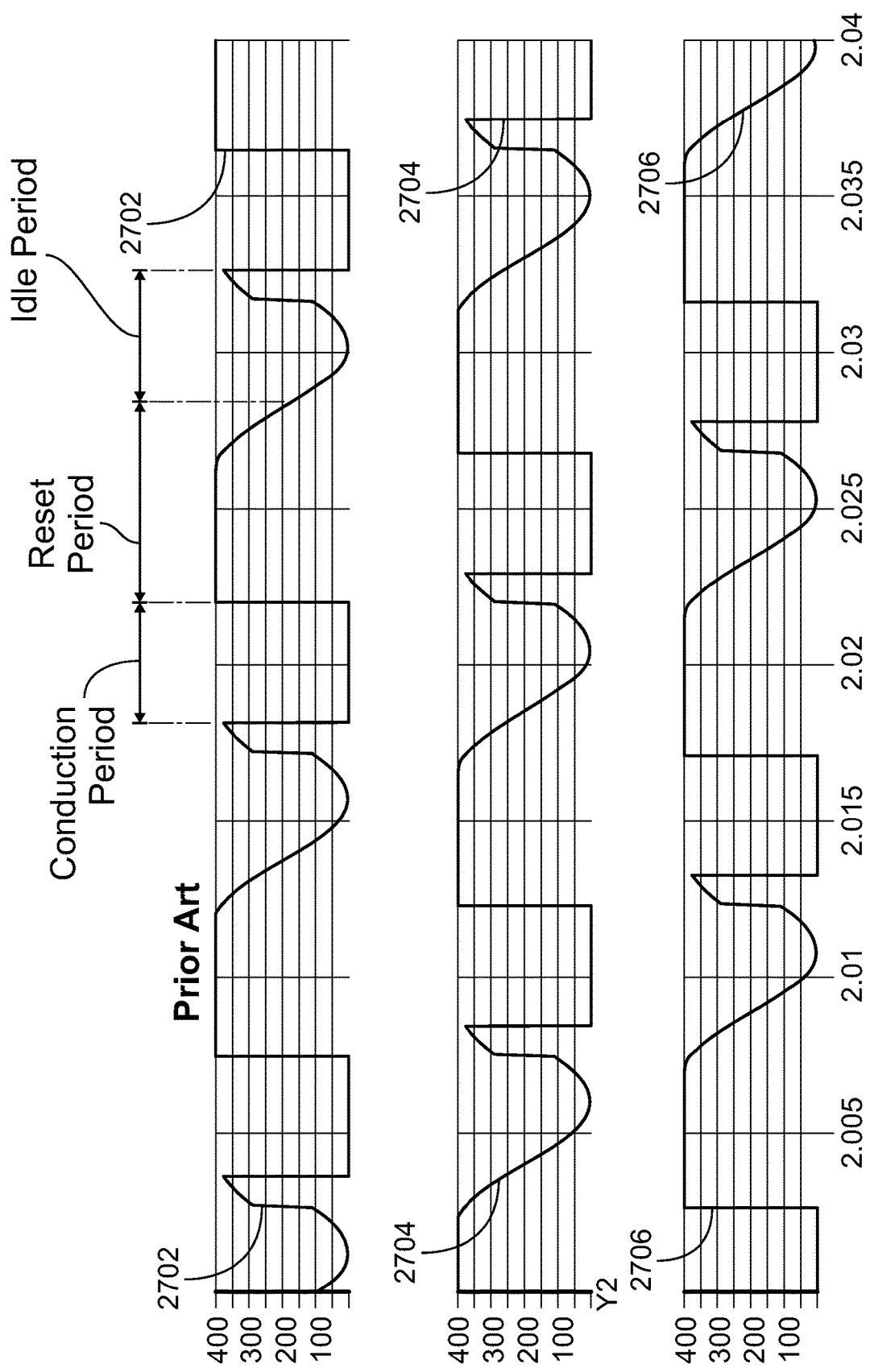
FIGS. 27A and 27B illustrate waveforms of a drain to source voltage of primary side switches of a conventional three phase interleaved forward power converter and a three phase interleaved forward power converter including three clamping circuits and experiencing a low idle time resonant frequency according to yet another example embodiment.
Figure 27B:
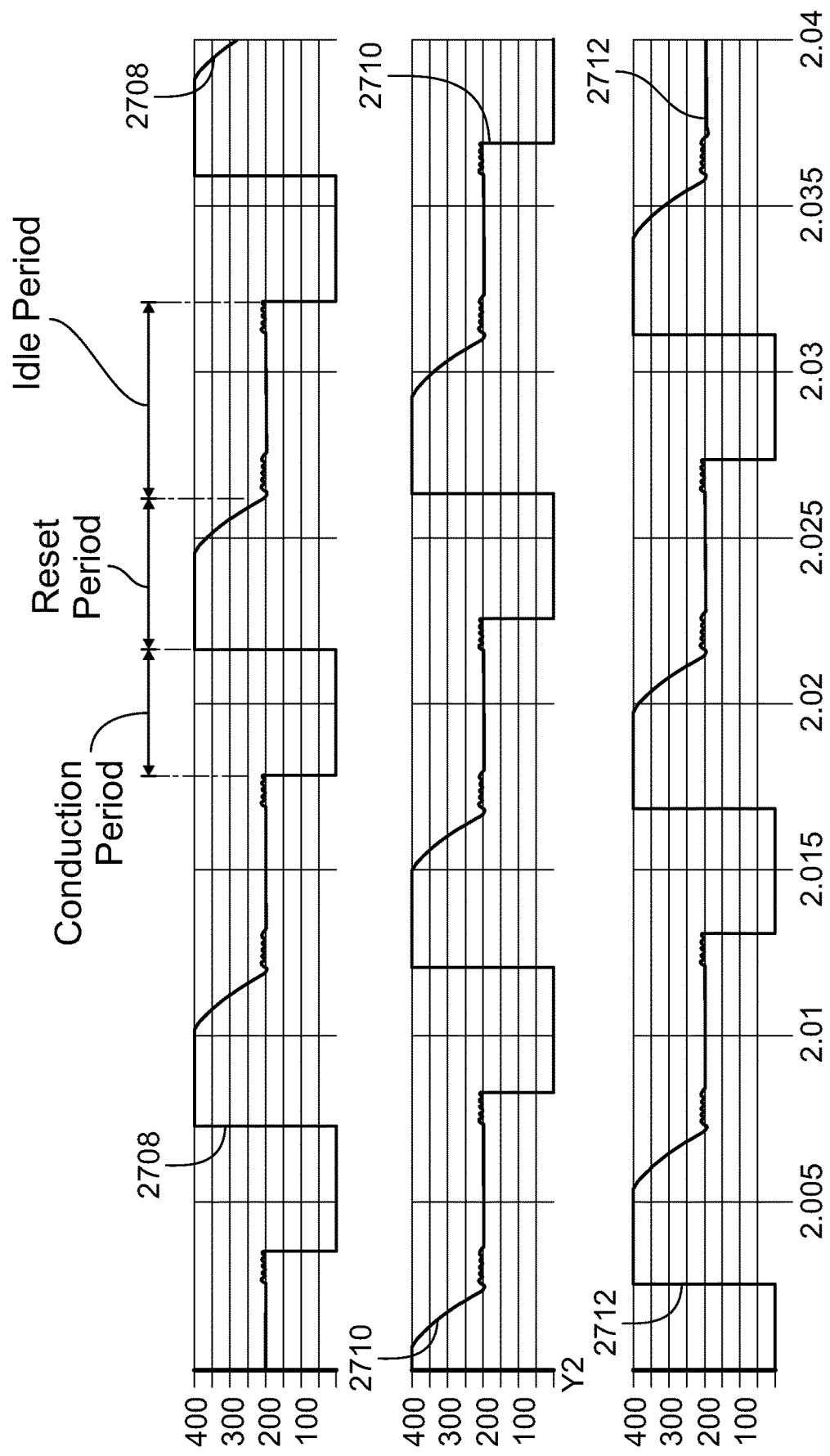

FIGS. 27A and 27B illustrate similar waveforms as FIGS. 26A and 26B, but for a multiphase interleaved forward power converter having three subconverters experiencing a lower idle time resonant frequency caused by a higher transformer leakage inductance and/or a higher switch capacitance. In particular, FIG. 27A illustrates voltages Vds (represented by lines 2702, 2704, 2706) of a primary side switch in three subconverters of a conventional multiphase interleaved forward power converter and FIG. 27B illustrates voltages Vds (represented by lines 2708, 2710, 2712) of a primary side switch in three subconverters of a multiphase interleaved forward power converter including clamping circuits as disclosed herein. As shown in FIG. 27B, the voltages Vds remain steady at about 200 volts during the idle period of each subconverter.

Additionally, by employing the clamping circuits disclosed herein, transformer AC excitation caused by idle time resonance may be reduced compared to conventional multiphase interleaved forward power converters. As a result, core losses due to idle time resonance may be substantially eliminated, switching losses of primary side switches and secondary side switches due to idle time resonance may be substantially eliminated, etc. As such, efficiency in forward power converters including the clamping circuits increases relative to other conventional forward power converters. This increased efficiency allows the forward power converters to meet industry compliance standards for various different rated loads. Further, the forward power converters including the clamping circuits include other benefits such as, for example, cancellation of ripple voltage and ripple current (e.g., on both the input and output), reduction of required filtering, soft switching (e.g., zero voltage switching and/or zero current switching), etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A forward power converter comprising:
    a first subconverter comprising a first output and a first transformer coupled to the first output;
    a second subconverter comprising a second output and a second transformer coupled to the second output; and
    first and second drives configured to respectively operate the first and second subconverters with cycling periods comprising:
        a conduction period during which power is provided to the output of the respective first or second subconverter via the respective first or second transformer; and
        an idle period;
    wherein the second drive is further configured to:
        phase shift the cycling periods in the second subconverter such that the conduction period of the second subconverter is at least partially complementary to the idle period of the first subconverter; and
        clamp a voltage across a winding of the transformer of the first subconverter to substantially prevent a first resonance voltage from propagating in the first subconverter during the idle period of the first subconverter.

2. The forward power converter of claim 1, wherein the cycling periods further comprise a reset period during which energy stored in the respective first or second transformer is released.

3. The forward power converter of claim 2, wherein the idle period occurs between the reset period and the conduction period.

4. The forward power converter of claim 1, wherein the first drive is further configured to phase shift the cycling periods in the first subconverter such that the conduction period of the first subconverter is at least partially complementary to the idle period of the second subconverter.

5. The forward power converter of claim 1, wherein the first output is coupled in parallel with the second output.

6. The forward power converter of claim 1 further comprising an inductor; and
    wherein the first and second outputs are coupled to the inductor.

7. The forward power converter of claim 1 further comprising a clamping circuit comprising a switching device coupled to the first transformer; and
    wherein the clamping circuit comprises a diode coupled to the switching device.

8. The forward power converter of claim 1, wherein the first subconverter comprises a pair of switching circuits, each switching circuit having one or more power switches;
    wherein the first transformer comprises a pair of primary windings; and
    wherein each switching circuit of the pair of switching circuits is coupled to a respective primary winding of the pair of primary windings.

9. The forward power converter of claim 1, wherein the second drive, in being configured to clamp the voltage, is configured to clamp the voltage across the winding of the first transformer based on at least one parameter of the second subconverter.

10. The forward power converter of claim 9, wherein the second subconverter comprises a switching circuit having one or more power switches coupled to the second transformer; and
    wherein the at least one parameter of the second subconverter comprises a signal for controlling at least one of the power switches of the second subconverter.

11. The forward power converter of claim 10, wherein the first drive is further configured to clamp a voltage across a winding of the second transformer based on at least one parameter of the first subconverter to substantially prevent a second resonance voltage from propagating in the second subconverter during the idle period of the second subconverter; and
    wherein the first subconverter comprises a switching circuit having one or more power switches coupled to the first transformer.

12. A method for substantially preventing a resonance voltage from propagating in a forward power converter including a first subconverter having a first transformer and including a second subconverter having a second transformer, the method comprising:
    operating the first and second subconverters with respective cycling periods, each cycling period comprising:
        a conduction period during which power is provided to the respective subconverter output via the respective transformer; and
        an idle period occurring after the conduction period;
    phase shifting the cycling periods in the first and second subconverters such that the conduction period of the respective first or second subconverter is at least partially complementary to the idle period of the other subconverter; and
    clamping a voltage across a first winding of the first transformer to substantially prevent a first resonance voltage from propagating in the first subconverter during the idle period of the first subconverter.

13. The method of claim 12, wherein each cycling period further comprises a reset period during which energy stored in respective transformer is released to reset the respective transformer; and wherein the idle period occurs between the conduction period and the reset period.

14. The method of claim 12 further comprising clamping a voltage across a winding of the second transformer to substantially prevent a second resonance voltage from propagating in the second subconverter during the idle period of the second subconverter.

15. The method of claim 12, wherein clamping the voltage comprises clamping the voltage across the winding of the first transformer subconverter based on at least one parameter of the second subconverter.

16. The method of claim 15, wherein the second transformer has a primary side and a secondary side; and wherein the at least one parameter of the second subconverter is a voltage on the secondary side of the second transformer.

17. The method of claim 12, wherein clamping the voltage comprises controlling a switching device of a clamping circuit to clamp the voltage across the first winding.

18. The method of claim 17, wherein the second subconverter comprises one or more power switches; and wherein the switching device of the clamping circuit is a power switch of the one or more power switches of the second subconverter.

19. The method of claim 17, wherein controlling the switching device comprises controlling the switching device based on at least one parameter of the second subconverter.

20. The method of claim 19, wherein the second subconverter comprises one or more power switches; and wherein the at least one parameter of the second subconverter comprises a signal for controlling at least one of the power switches of the second subconverter.

* * * * *